Figure 7:
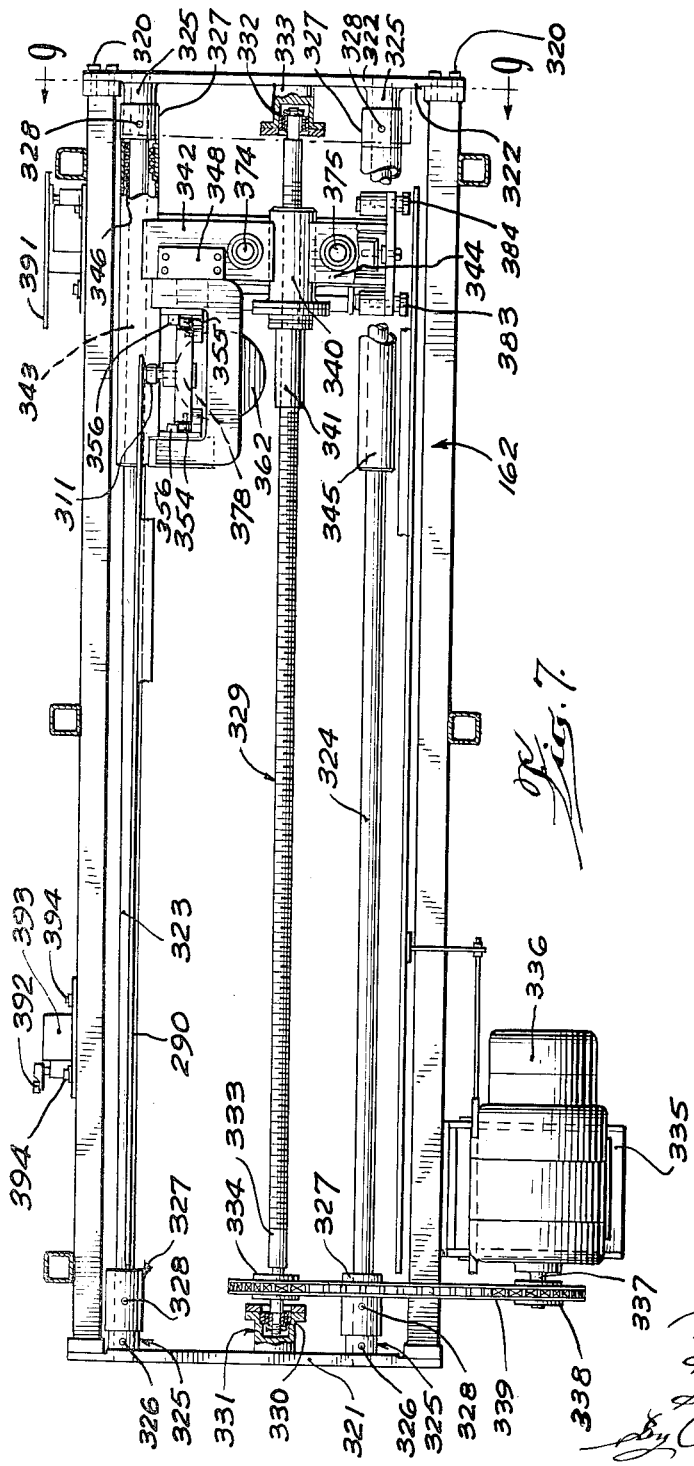

Feb. 15, 1966 N. H. VOGT ETAL 3,234,591
BREAK-UP OF IRREGULAR MASSES AND PARTICULARLY ANIMAL CARCASSES
Original Filed Dec. 20, 1960 17 Sheets-Sheet 1
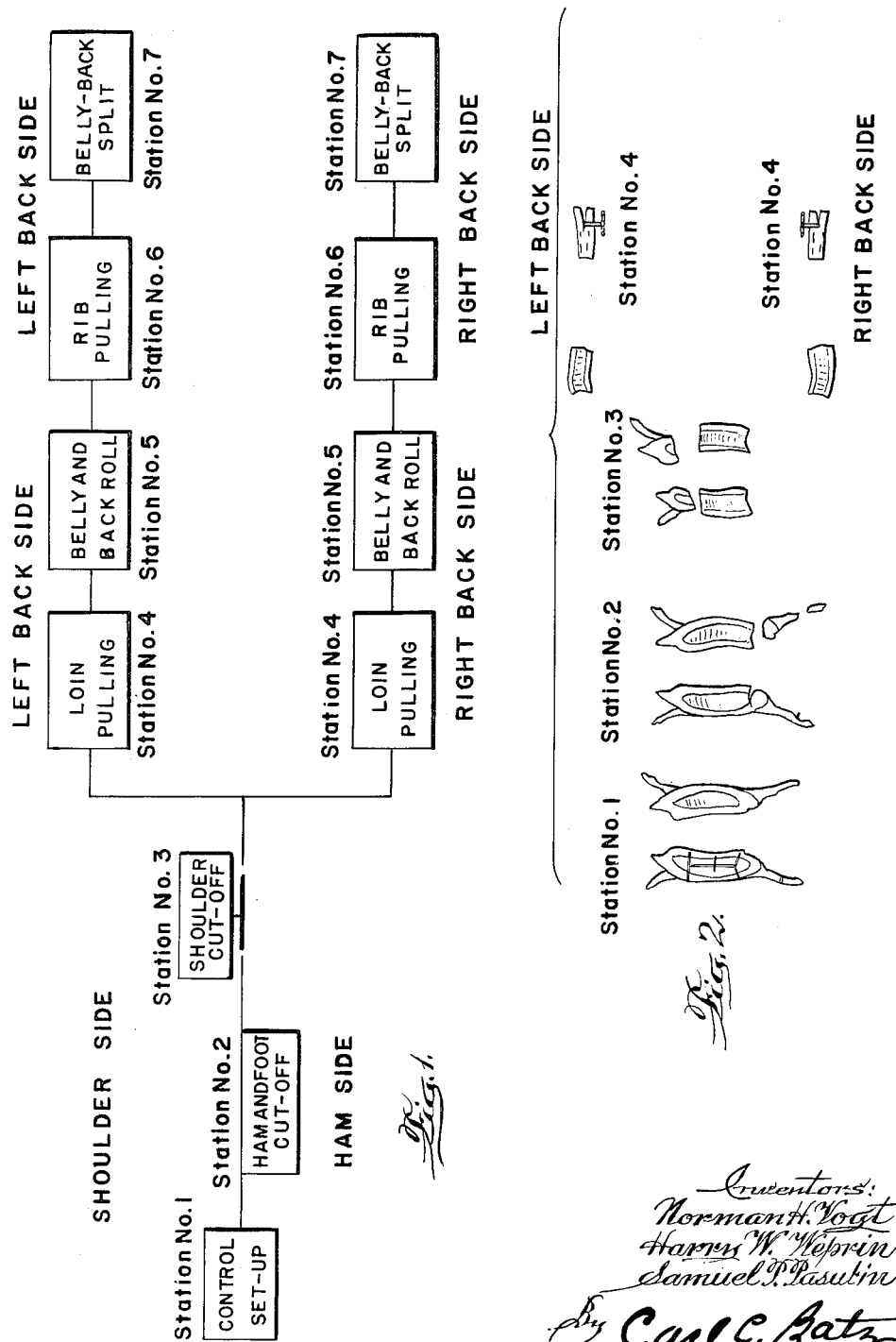

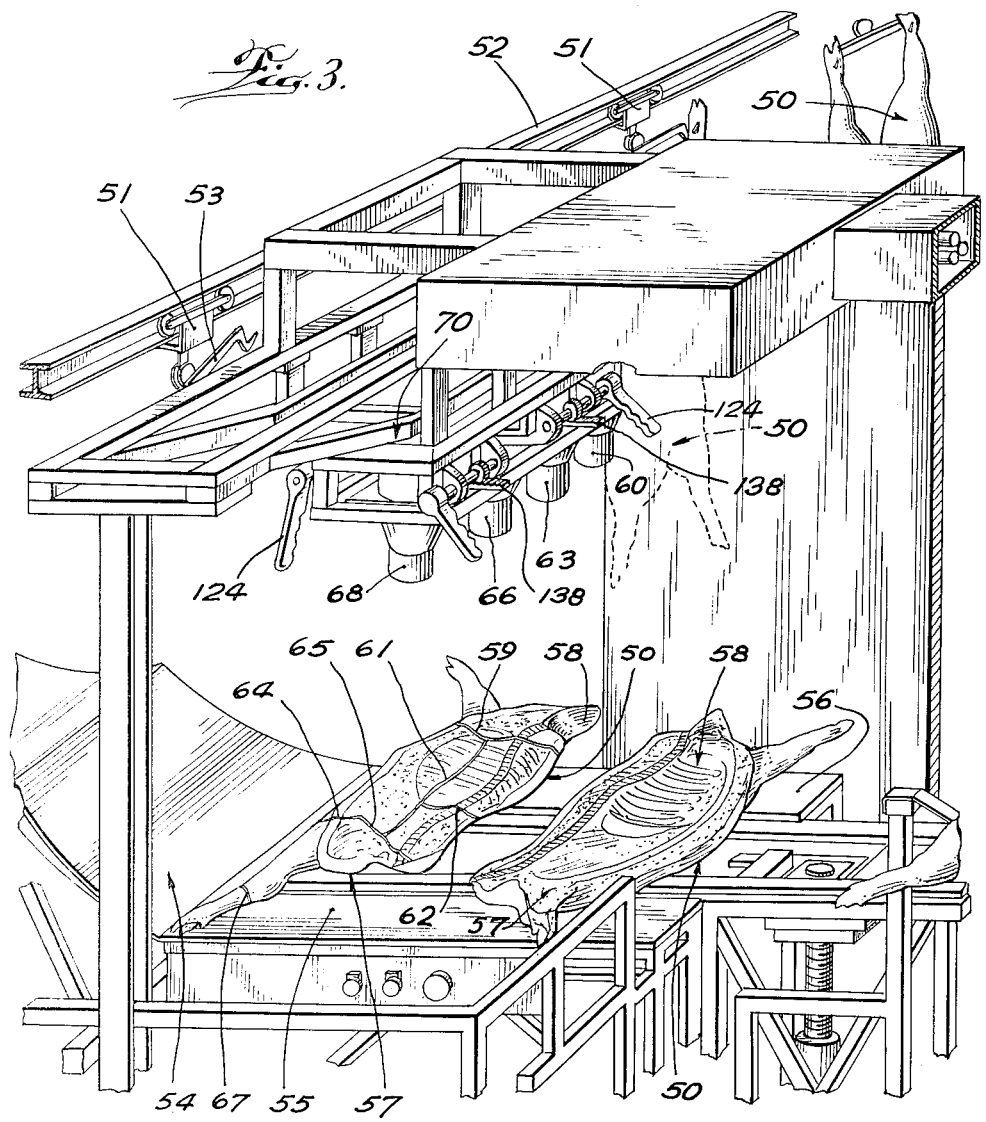

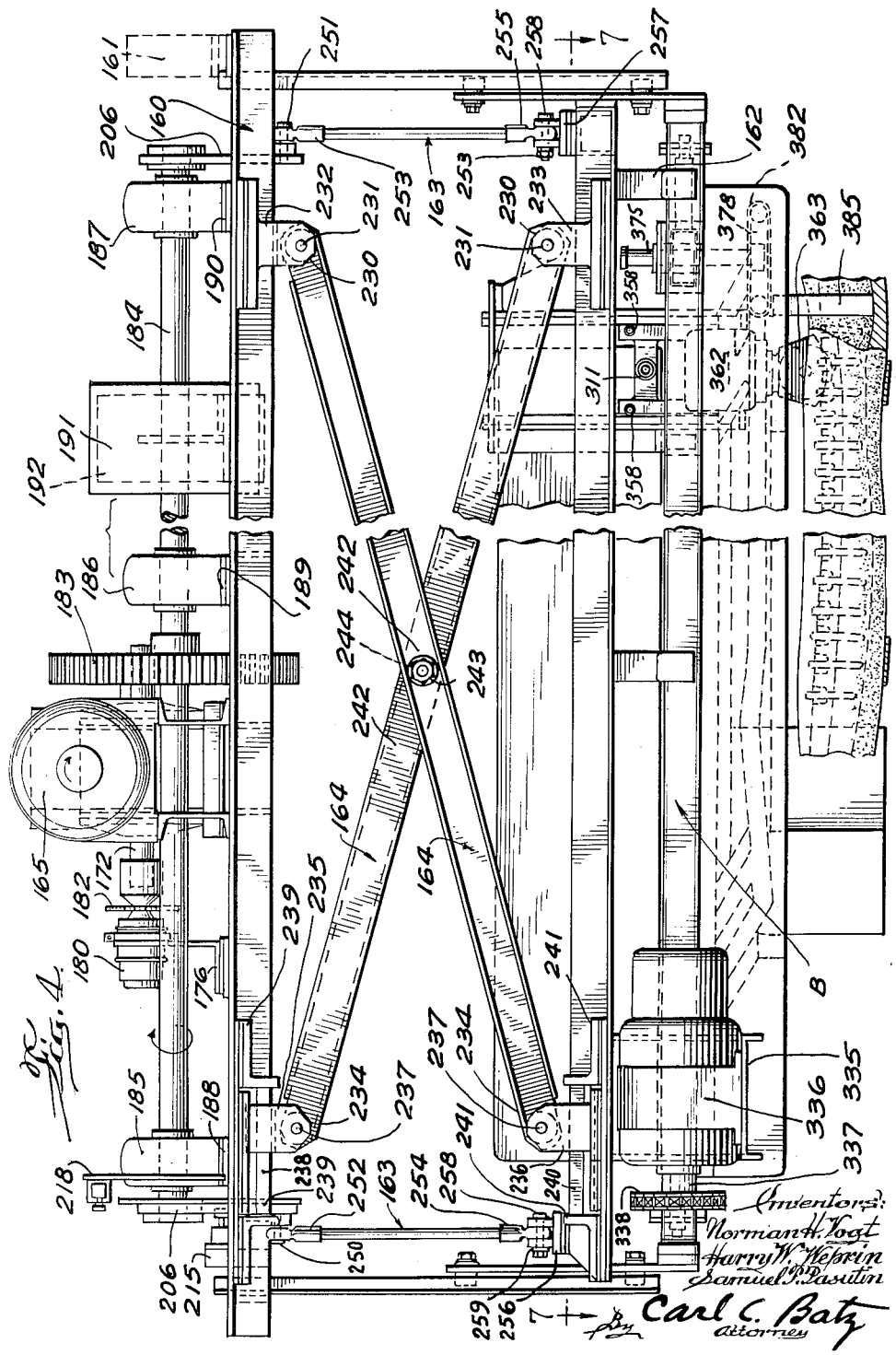

Feb. 15, 1966 N. H. VOGT ETAL 3,234,591
BREAK-UP OF IRREGULAR MASSES AND PARTICULARLY ANIMAL CARCASSES
Original Filed Dec. 20, 1960 17 Sheets-Sheet 4
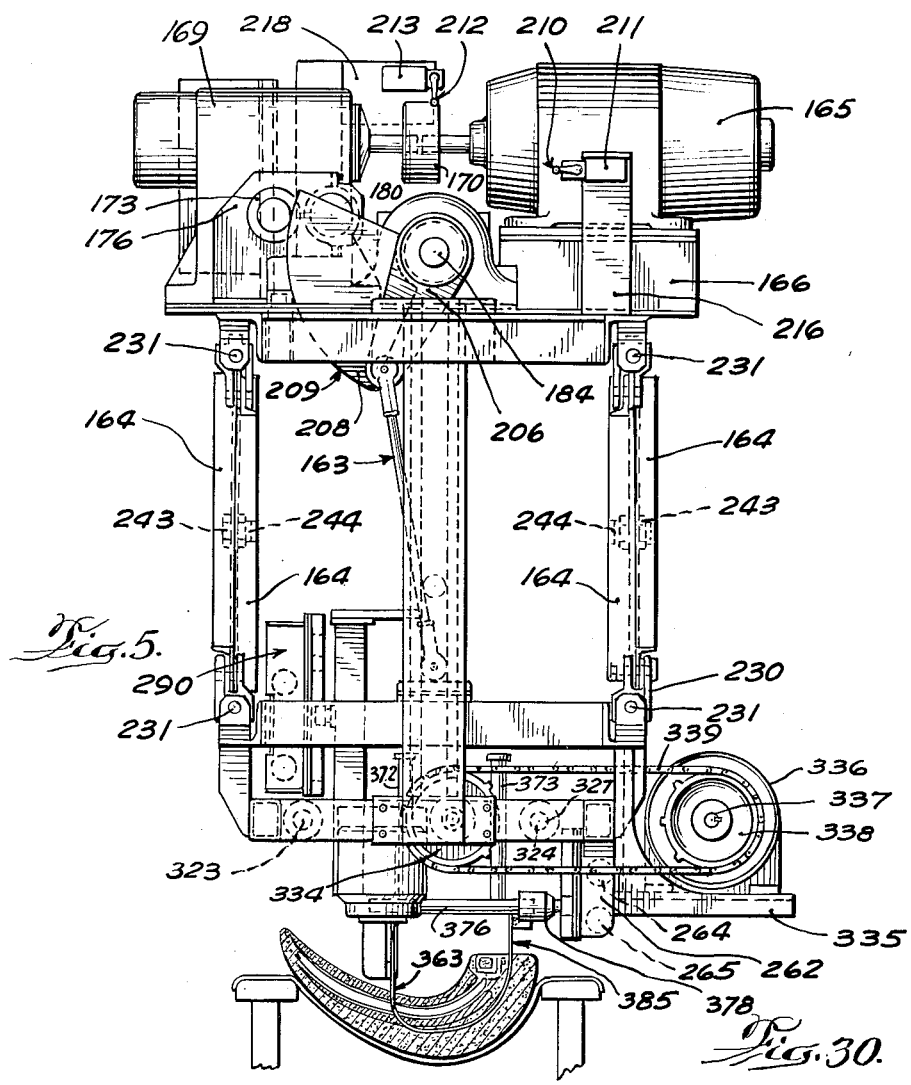
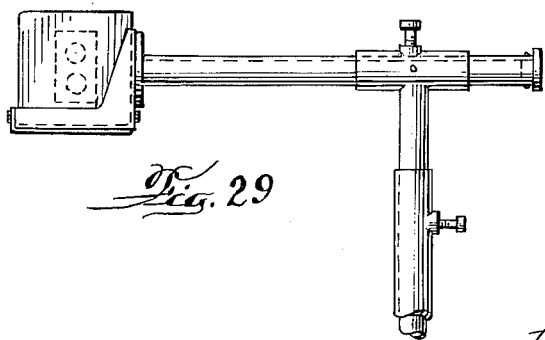
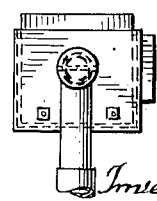

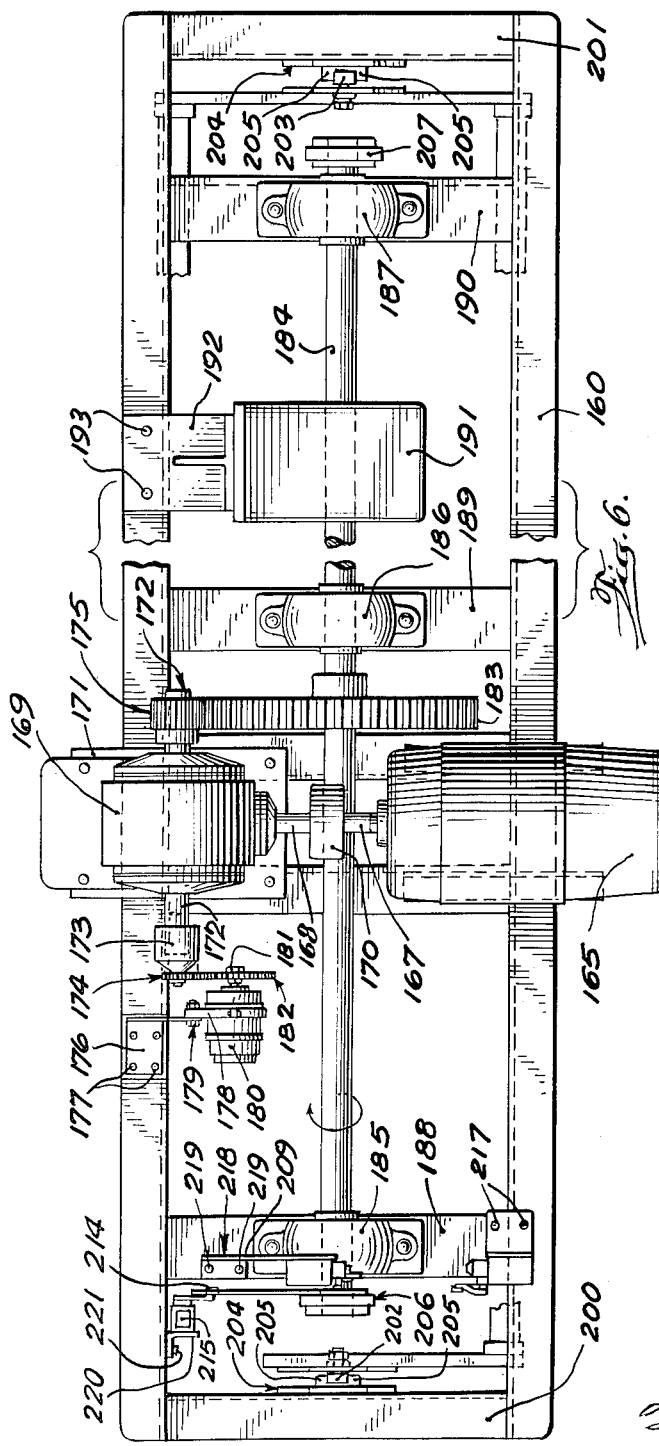

Feb. 15, 1966 N. H. VOGT ETAL 3,234,591
BREAK-UP OF IRREGULAR MASSES AND PARTICULARLY ANIMAL CARCASSES
Original Filed Dec. 20, 1960 17 Sheets-Sheet 6

Inventors:
Norman H. Vogt
Harry W. Weprin
Samuel P. Pasutin
By Carl C. Batz
Attorneys

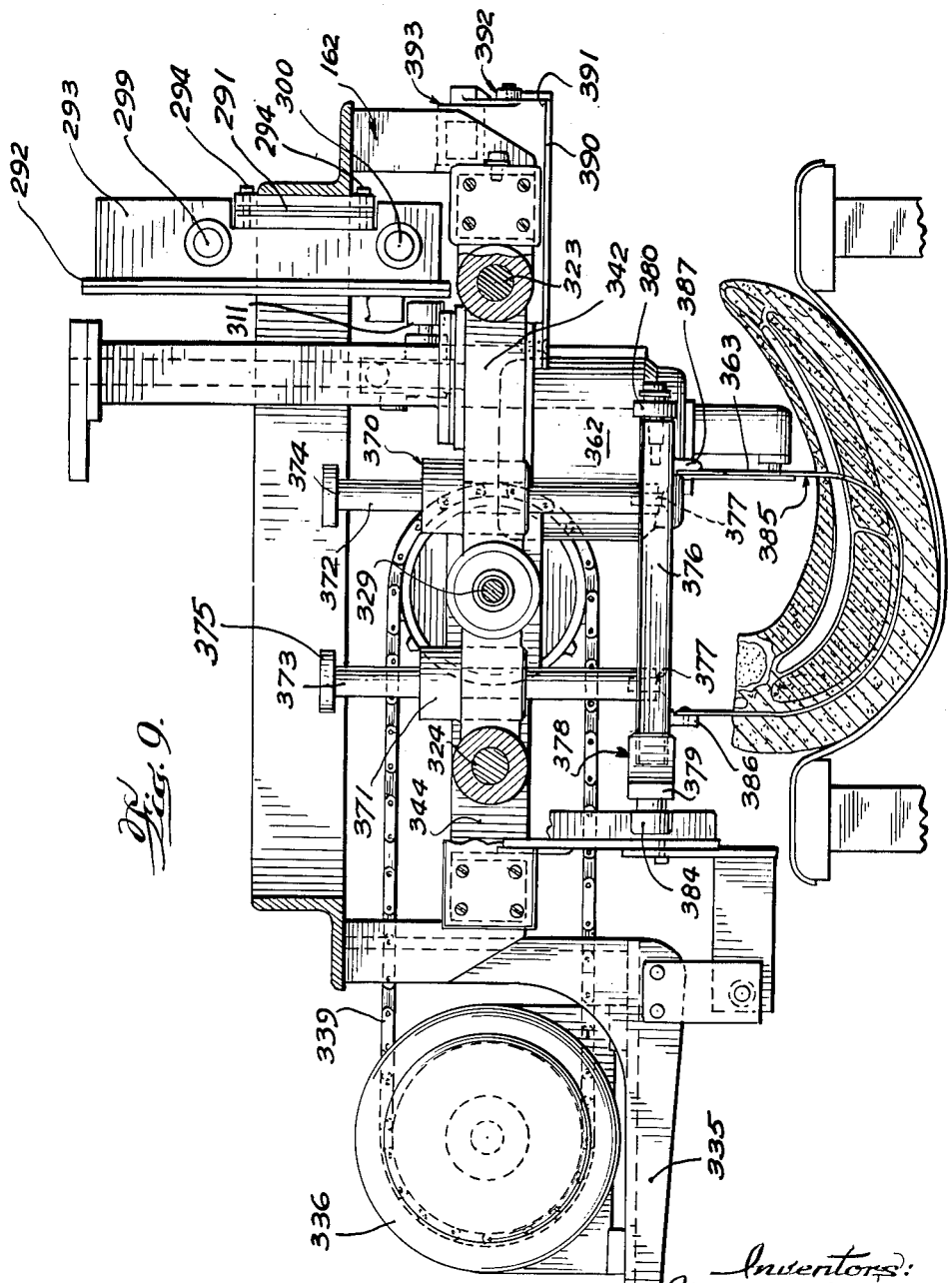

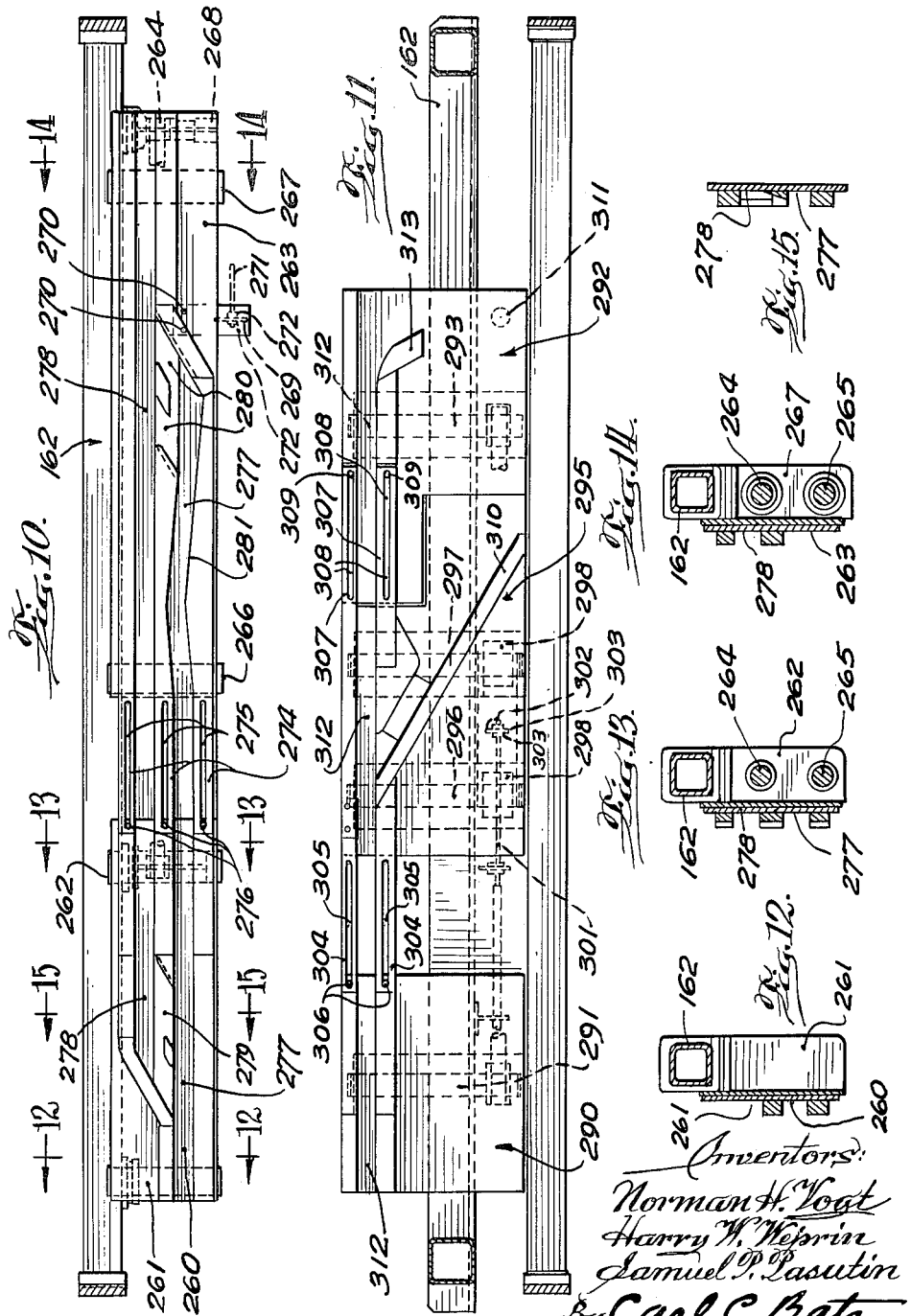

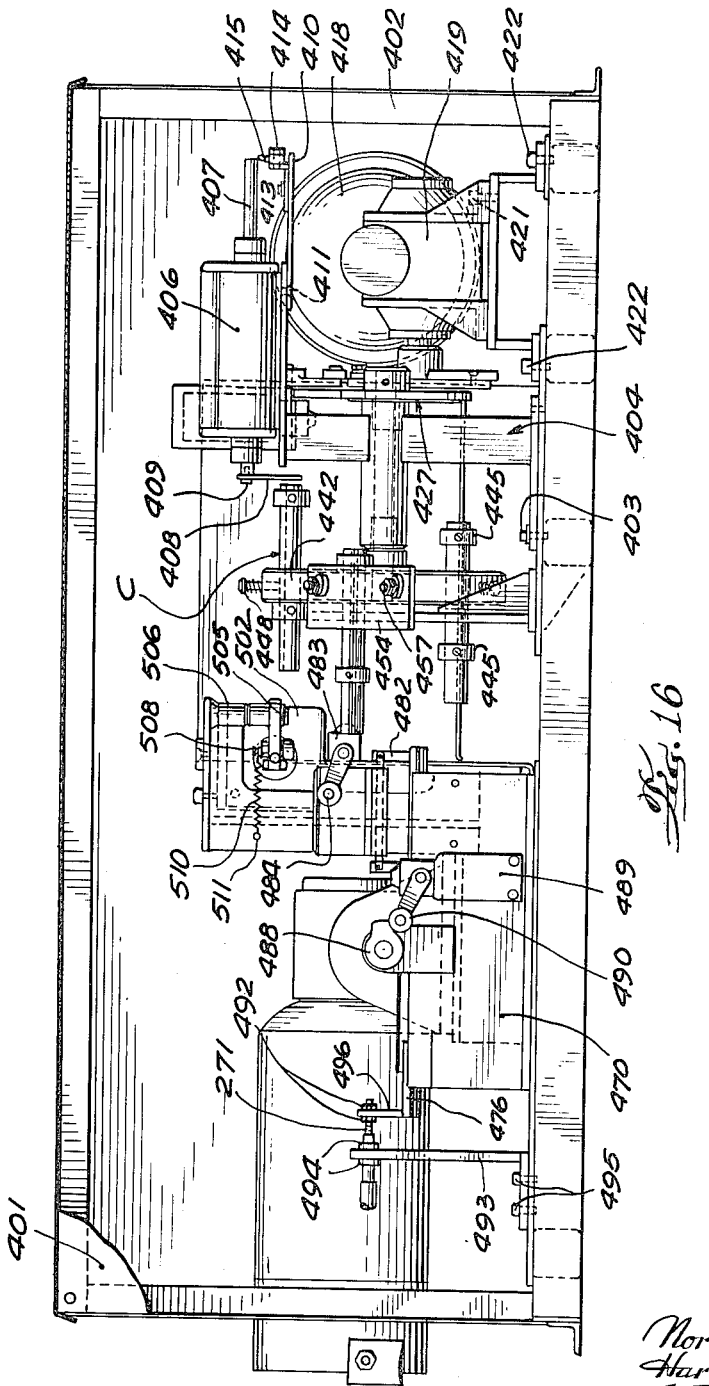

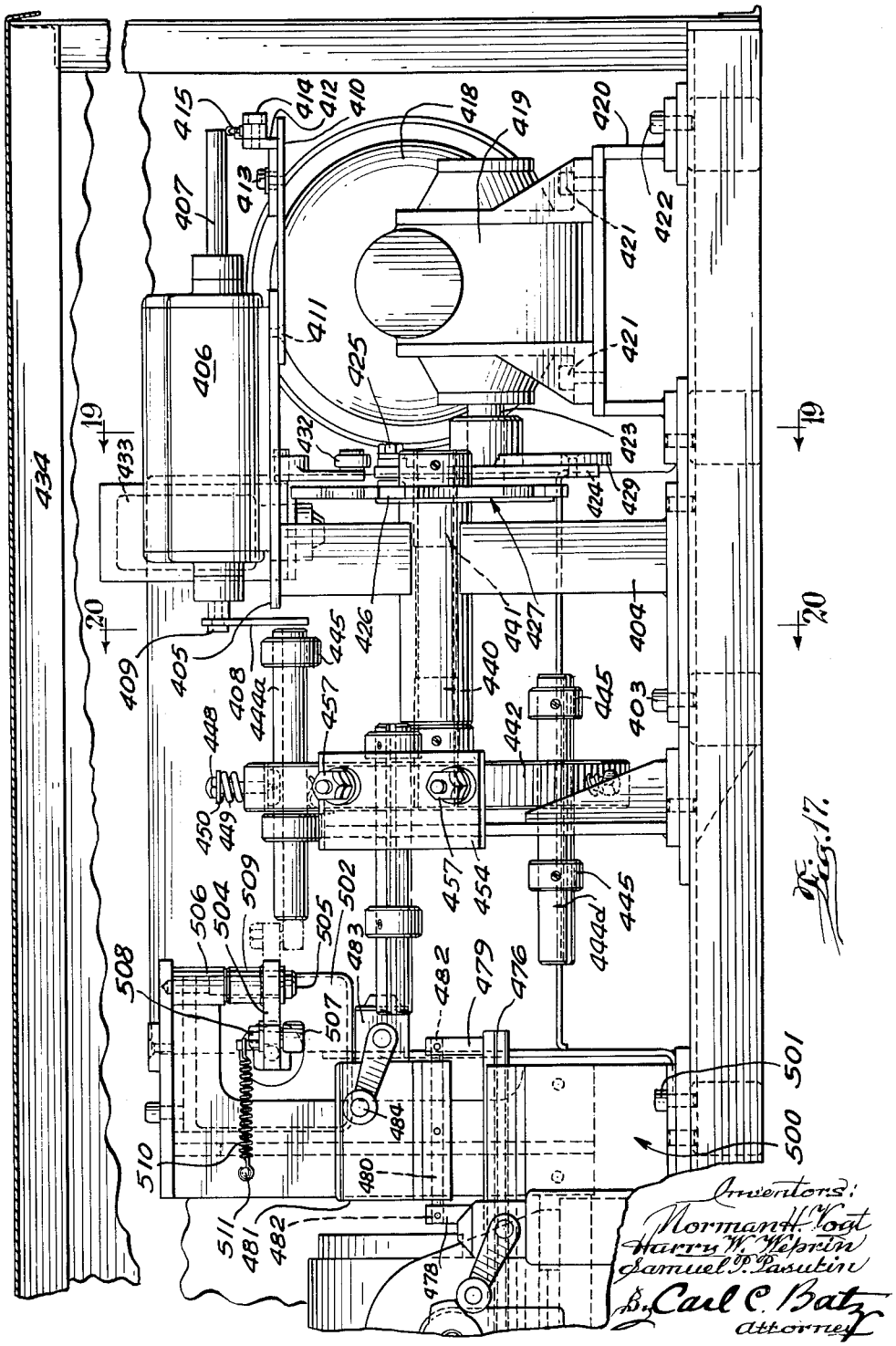

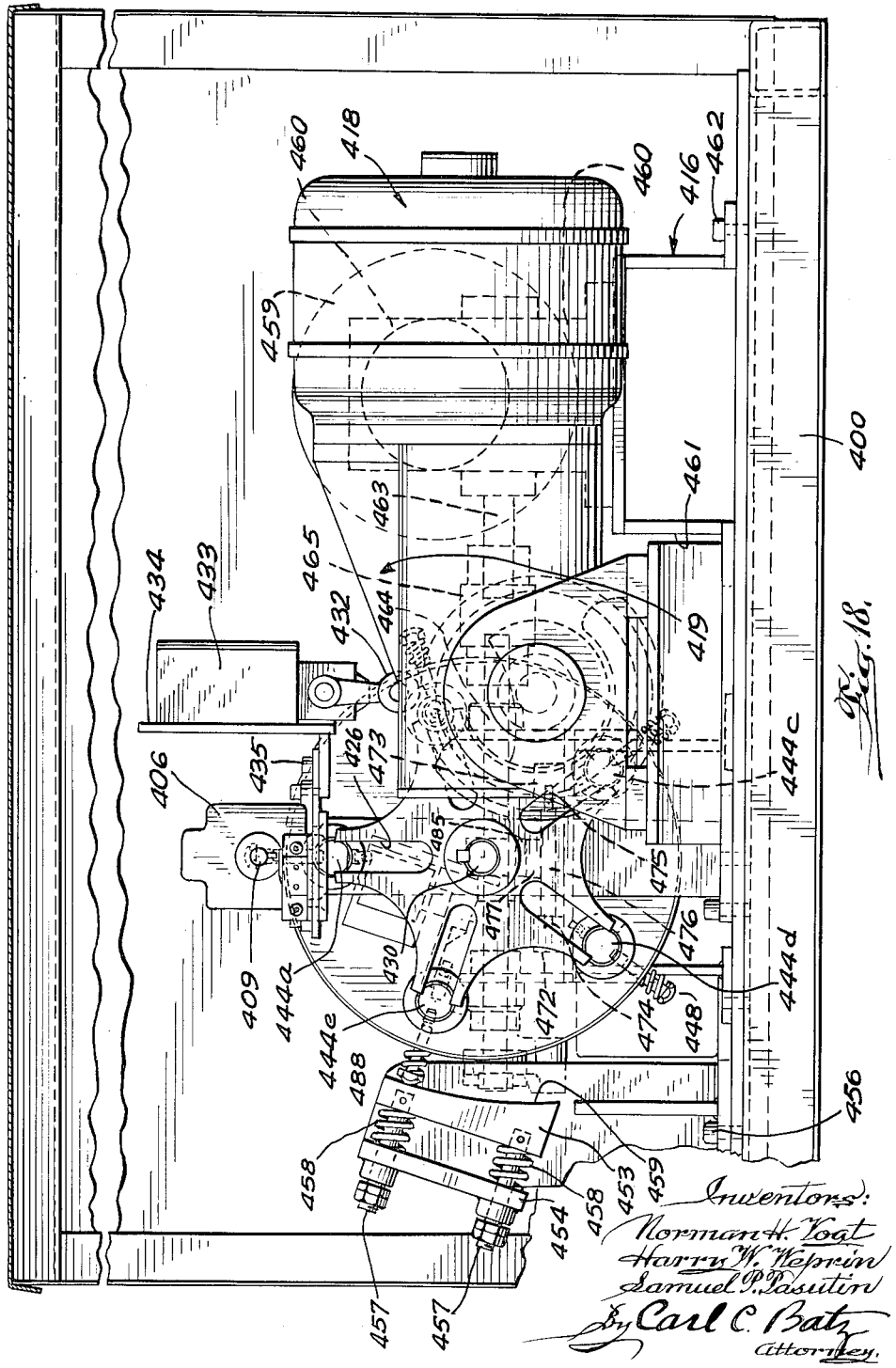

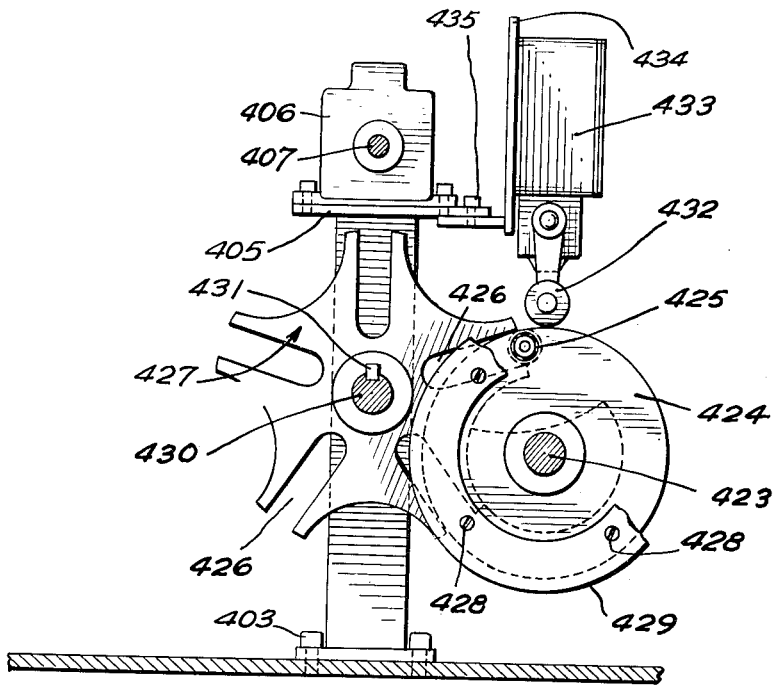

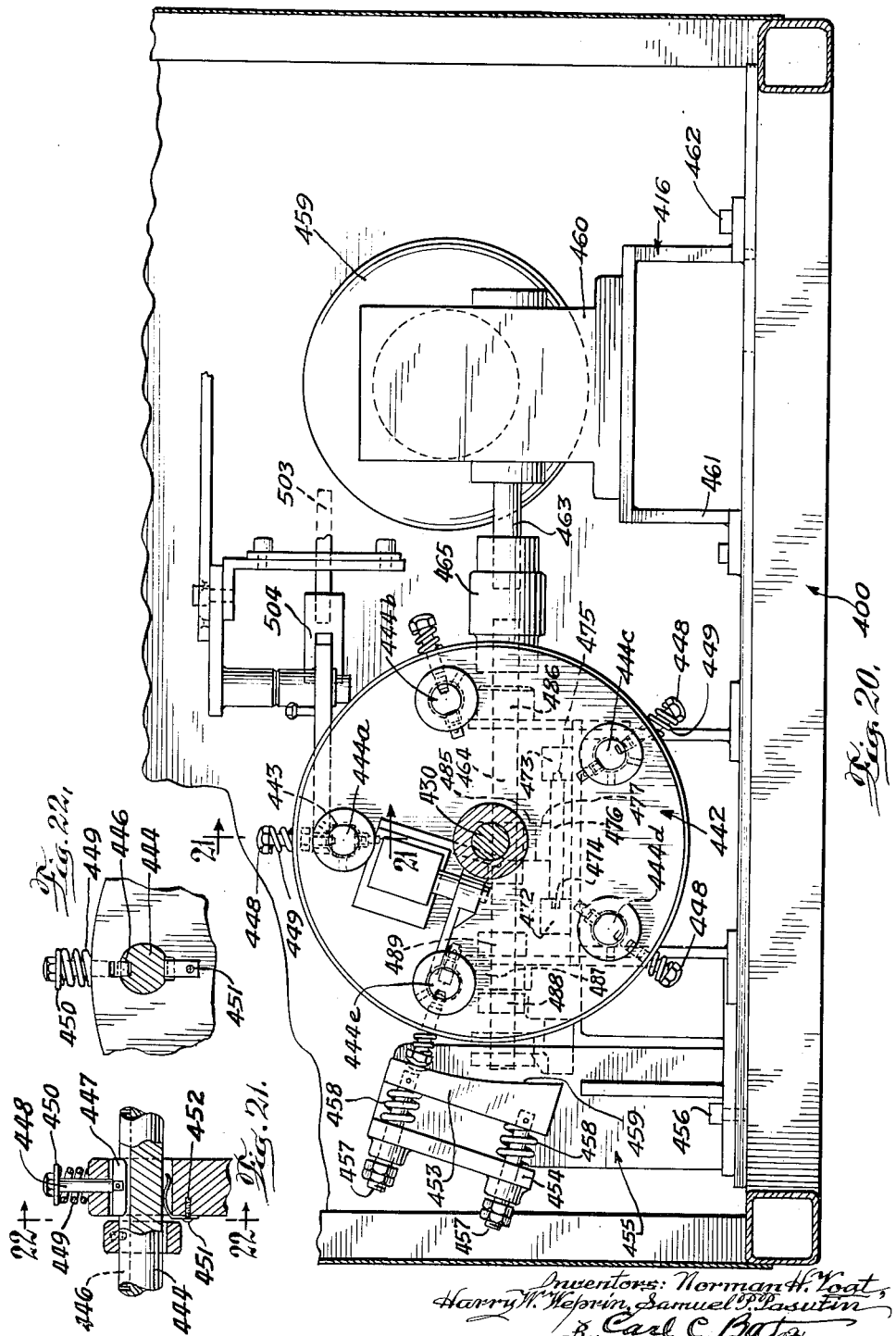

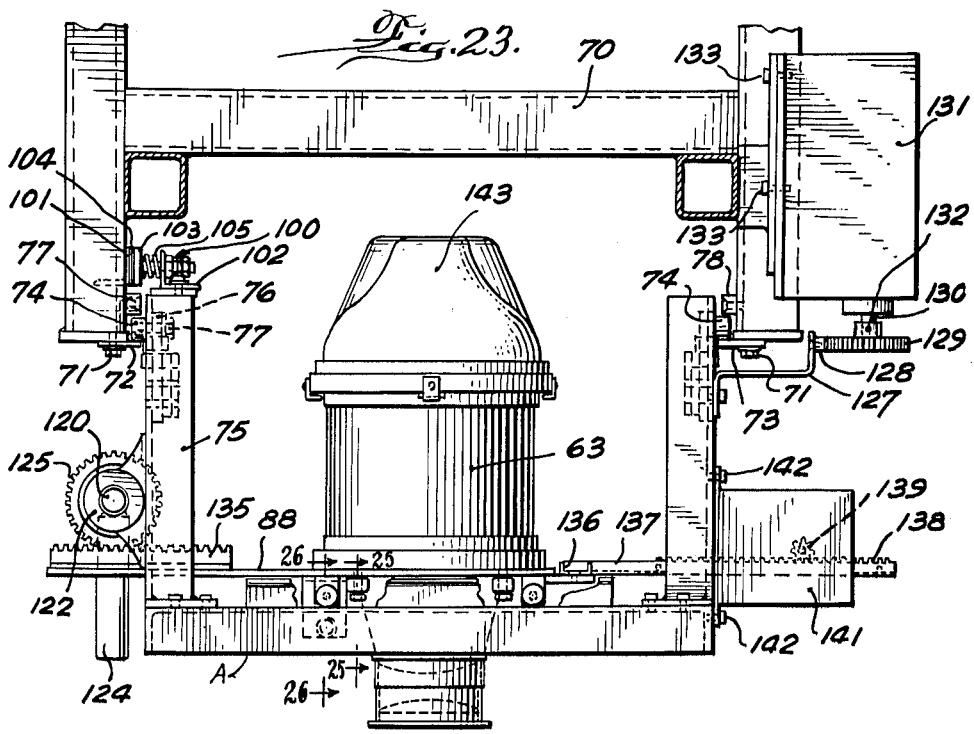
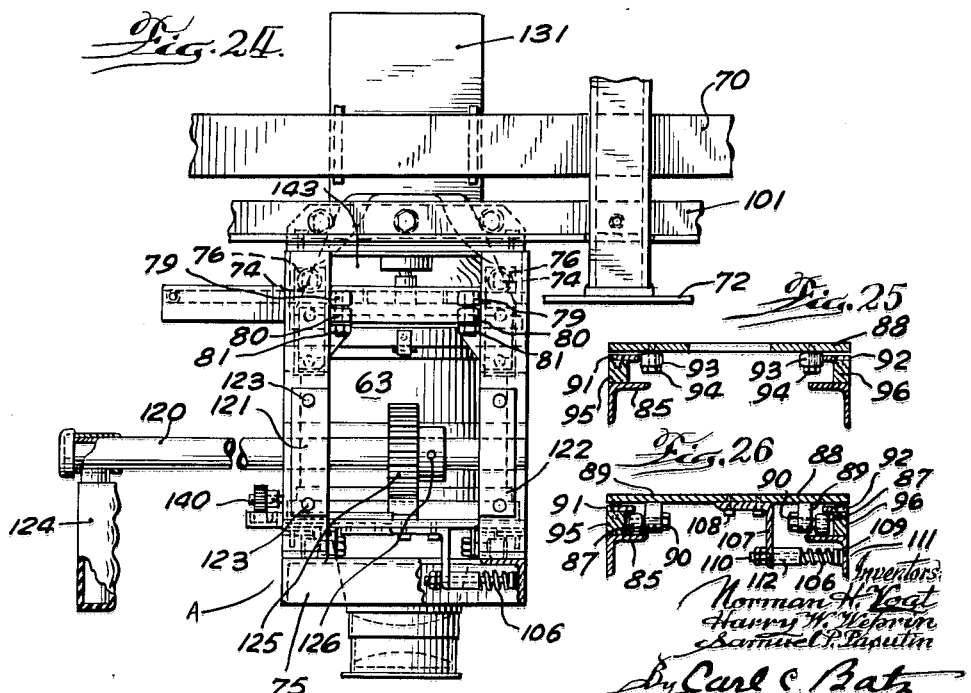

Feb. 15, 1966   N. H. VOGT ETAL   3,234,591
BREAK-UP OF IRREGULAR MASSES AND PARTICULARLY ANIMAL CARCASSES
Original Filed Dec. 20, 1960   17 Sheets-Sheet 16

Inventors:
Norman H. Vogt
Harry W. Weprin
Samuel Pasutin
By Carl C. Batz
Attorney

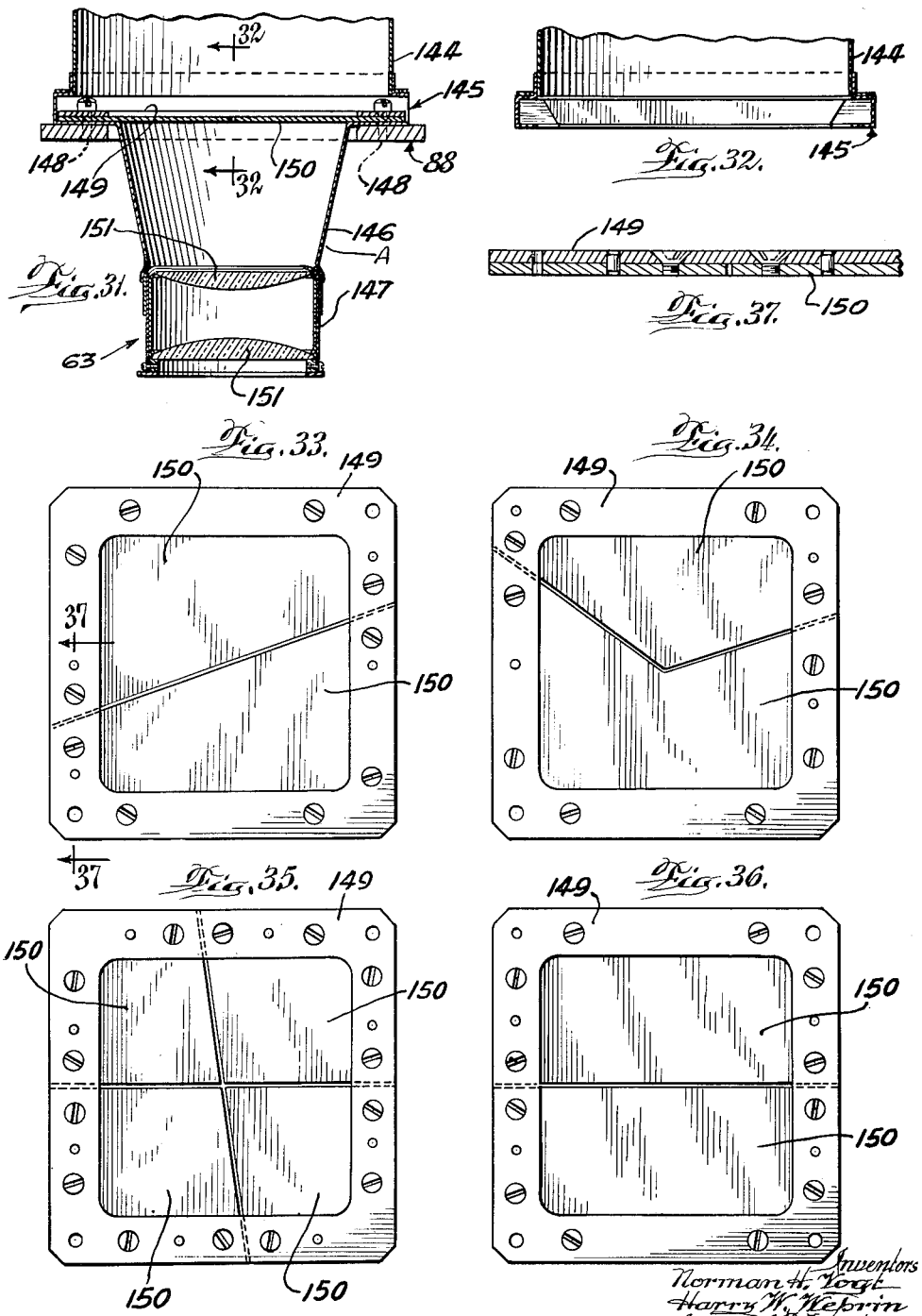

United States Patent Office 3,234,591
Patented Feb. 15, 1966

3,234,591
BREAK-UP OF IRREGULAR MASSES AND PARTICULARLY ANIMAL CARCASSES
Norman H. Vogt, Clawson, Mich., Harry W. Weprin, Chicago, Ill., and Samuel Pasutin, Royal Oaks, Mich., assignors to Armour and Company, Chicago, Ill., a corporation of Delaware
Original application Dec. 20, 1960, Ser. No. 77,121, now Patent No. 3,177,520, dated Apr. 13, 1965. Divided and this application Sept. 16, 1964, Ser. No. 403,678
2 Claims. (Cl. 17—45)

This is a division of application Serial No. 77,121, filed December 20, 1960, and issuing as Patent No. 3,177,520 on April 13, 1965.

This invention relates to the break-up of irregular masses and, more particularly, to the dividing or separating of masses by process means employing a pre-selection or sighting control. The invention is particularly useful in the breaking-up of animal carcasses of varying sizes and shapes through the use of control means at the beginning of the break-up operation. For simplicity in description, the invention will be described in connection with the break-up of a hog carcass, but it will be understood that such illustration is by way of example and that the invention is applicable to many other physical types of masses having irregular or varying shapes and sizes.

In the break-up of pork carcasses, it has been the practice to move the carcass halves along conveyors and perform the various cutting steps by manual operations, and such operations were regarded as necessary hand operations because of the great irregularities in the carcasses and the importance of recovering all of the valuable portions of the lean meat and other meat portions. For example, in the drawing of the valuable loin portion near the saddle of the hog, it is found that the saddle position in a short hog carcass is at an entirely different position from that in a long hog carcass, and a manual operation has been considered necessary in order to recover all of the loin from such irregular bodies. Further, the fat and lean portions vary in depth, the rib structures of the carcasses vary in size, and the operator has been obliged to change the line of the scribe cut and the U-shaped knife cut with each individual carcass. As a result of the foregoing, it has been necessary to employ a number of stations along a traveling belt at which operators are stationed for using cutting machines or tools in the break-up of the carcass.

If it were possible to provide mechanical means for performing the cutting operations while at the same time providing sighting control means at the beginning of the break-up operation by which one or two operators could at the outset pre-select the elements and their positioning at the various stations for a particular carcass so that as the carcass traveled through the apparatus the cutting elemens were automatically positioned for dividing the carcass in a manner responsive to the pre-selection at the first station, a great saving in time, labor and expense would be achieved.

One object, therefore, of the present invention is to provide a method by which irregular or varying masses may be divided or separated by means responsive to an initial sighting or alignment control whereby the break-up of the masses is accomplished in successive operations under such control. Another object is to provide a method adapted to break up an animal carcass or other mass in a series of successive operations responsive to a control which is set up at the start of such operations. A further object is to provide means in which an animal carcass or other mass is divided or separated by a mechanism in which the dividing means is moved relative to the carcass or the carcass is moved relative to the dividing means, or both are moved relative to each other, all such movements being responsive to a pre-selecting sighting mechanism provided at the start of the operations. A still further object is to provide mass-positioning means, a dividing element, an element-positioning means, a movable sighting device adapted to be brought into alignment with a portion of the mass, and means responsive to the movement of the sighting mechanism for controlling the positioning of said mass or dividing element. Yet a further object is to provide a delayed control means in combination with mass-moving and mass-dividing means whereby said control means may be adjusted relative to a mass at the beginning of the apparatus to pre-select the positions of said mass-dividing and mass-moving means, but delaying the action of the latter until after other separating operations have been performed following said sighting operation. A still further object is to provide improved loin-pulling means and pre-selecting control mechanism therefor. Other specific objects and advantages will appear as the specification proceeds.

Figure 8:
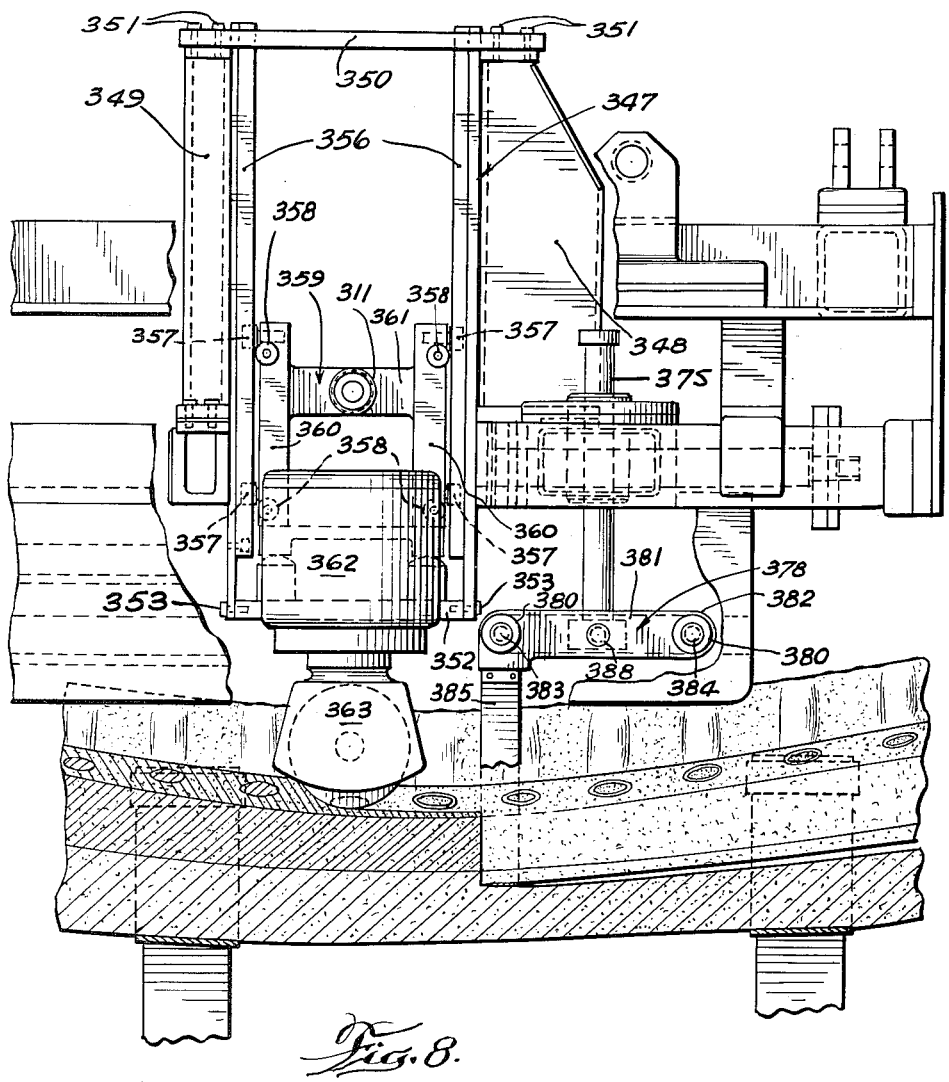
Figure 27:
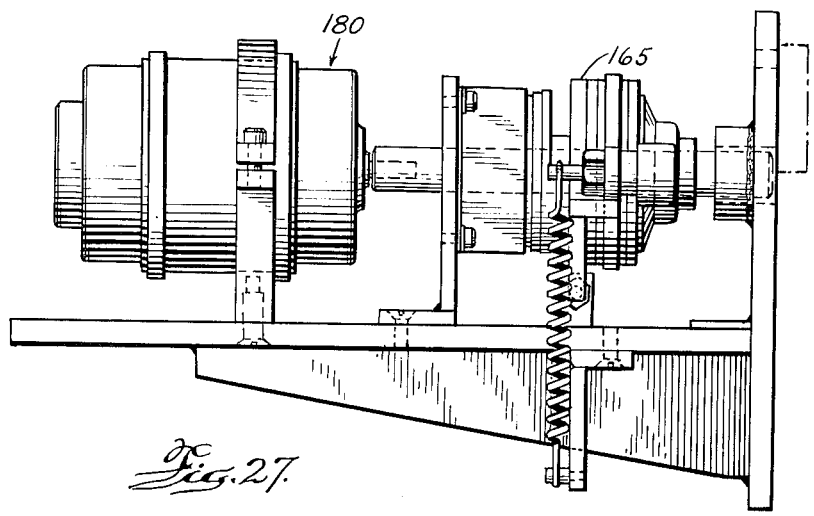
Figure 28:
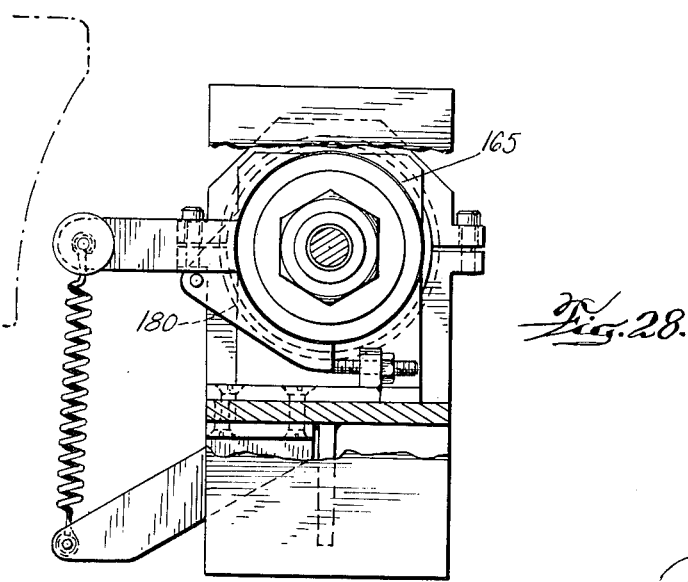

The invention is shown, in an illustrative embodiment, by the accompanying drawings, in which:

FIGURE 1 is a diagrammatic showing of the sequence of operations performed by the apparatus and method of our invention; FIG. 2, a diagrammatic top plan view of pork carcass halves and of the separating operations performed at three successive stations; FIG. 3, a perspective view, taken at the beginning or inlet of the apparatus, and showing the positioning of the carcass halves during the alignment or sighting operation; FIG. 4, a side view in elevation of the loin-pulling apparatus and the mechanism for vertically adjusting said apparatus; FIG. 5, an end view, partly in section, of the carcass-supporting means and loin-pulling mechanism; FIG. 6, a top plan view of the structure shown in FIG. 5; FIG. 7, a detail sectional view with parts broken away, the section being taken as indicated at line 7—7 of FIG. 4; FIG. 8, a broken, enlarged, detail view showing the scribe saw and loin-pulling knife and the operating mechanism therefor; FIG. 9, an enlarged, part-sectional view, the section being taken as indicated at line 9—9 of FIG. 7; FIG. 10, a detail view in side elevation of the cam means for operating the loin-pulling knife; FIG. 11, a view similar to FIG. 10, showing the cam means for operating the scribe saw; FIG. 12, a detail sectional view, the section being taken as indicated at line 12—12 of FIG. 10; FIG. 13, a detail sectional view, the section being taken as indicated at line 13—13 of FIG. 10; FIG. 14, a detail sectional view, the section being taken as indicated at line 14—14 of FIG. 10; FIG. 15, a detail sectional view, the section being taken as indicated at line 15—15 of FIG. 10; FIG. 16, a side elevational view of a Geneva movement delay control mechanism for operating the cam adjustments controlling the movement of the scribe saw and loin-pulling knife; FIG. 17, a view similar to FIG. 16 but showing a portion of the apparatus in enlargement; FIG. 18, a broken end view of the structure shown in FIG. 17; FIG. 19, a part-sectional detail view, with portions of the structure broken away the view being taken as indicated at line 19—19 of FIG. 17; FIG. 20, a view similar to FIG. 19, the section being taken as indicated at line 20—20 of FIG. 17; FIG. 21, a detail sectional view, the section being taken as indicated at line 21—21 of FIG. 20; FIG. 22, a broken sectional view, the section being taken as indicated at line 22—22 of FIG. 21; FIG. 23, a broken front view in elevation of the sighting mechanism at the first station of the apparatus; FIG. 24, a broken side view of the structure shown in FIG. 23; FIG. 25, a sectional view, the section being taken as indicated at line 25—25 of FIG. 23; FIG. 26, a sectional view, the section being taken as indicated at line 26—26 of FIG. 23; FIG. 27, a broken side view in elevation of a Selsyn motor control device; FIG. 28, an end view in elevation of the structure shown in FIG. 27; FIG. 29, a broken elevational view of a color-responsive control device for controlling the depth of cut of the loin-pulling knife; FIG. 30, an end view in elevation of the structure shown in FIG. 29; FIG. 31, a broken vertical sectional view of the sighting mechanism shown in FIG. 23; FIG. 32, a sectional view, the section being taken as indicated at line 32—32 of FIG. 31; FIG. 33, a bottom plan view of one of the sighting devices for projecting a light upon the leg of the carcass at the point the leg is to be cut off; FIG. 34, a view similar to FIG. 33 but showing the light slot of another sighting device to indicate the ham cut-off; FIG. 35, a view similar to FIG. 33 of another sighting device showing cross slots for projecting a light pattern adapted to be aligned with the saddle of the carcass and with the scribe line; FIG. 36, a view similar to FIG. 33 showing the light-emitting slot of another sighting device for alignment with the shoulder of the carcass along the line where the shoulder is to be cut off; and FIG. 37, a sectional detail view on an enlarged scale, the section being taken as indicated at line 37—37 of FIG. 33.

In the embodiment of our invention illustrated in the foregoing drawings, A designates the sighting or alignment mechanism which is manipulated by the operator or operators to bring the lines of light into the desired positions for break-up of the carcass; B designates loin-pulling mechanism at the fourth station of operations; and C designates delay control means whereby carcass-moving and dividing elements at the loin-pulling station are moved into the desired relative position for dividing the carcass in response to a selection made at the first station by the sighting mechanism for this particular carcass, such control mechanism being responsive to the alignment made at the first station but delaying action until the carcass in question reaches the loin-pulling station.

Intermediate the control set-up or sighting station A and the loin-pulling station B, are dividing operations as indicated more clearly in FIGS. 1 and 2. There is a ham and foot cut-off station which may be referred to as the second station. There is a shoulder cut-off operation in which a saw 40 is provided and which may be referred to as the third station. The pork halves, which have been moved transversely as indicated in FIG. 2 through stations 1, 2 and 3 for the removal of the ham and foot on the one side and the shoulder on the other side, are now separated, one of the halves containing the belly and back being moved laterally to the right and the other similar half being moved to the left and passed through the separate operations indicated in FIG. 1, namely, a loin-pulling operation (station 4), a belly and back roll operation (station 5), a rib-pulling operation (station 6), and a belly-back slit (station 7).

In the operation illustrated diagrammatically in FIG. 1, the carcass halves or portions may be moved in any manner through the various stations and the operations carried on as described. We prefer, however, to employ automatic conveyor mechanism which will carry the carcasses or parts thereof through the various operations. Any suitable conveyor apparatus may be employed, such as, for example, the apparatus shown in detail in our copending application, Serial No. 110,076.

*Control set-up and sighting mechanism*

The sighting mechanism A is employed for preselecting the points or lines of division of the carcass so that at later stages in the operation the individaul carcass can be divided in accordance with the selection made at the first station—the control set-up. The sighting mechanism is best illustrated in FIGS. 3, 23 through 26, and 31 through 37.

Referring particularly to FIG. 3, hog carcasses 50 are carried by overhead trolleys 51 along rail 52. As the carcasses 50 and trolley 51 contact the automatic hog dropping mechanism 53, the carcasses are automatically released from trolleys 51 and drop upon chute 54. The hog halves are positioned skin side down on table 55 and table 56, the ham end 57 resting on table 55 and the shoulder end 58 resting on table 56.

Shoulder line 59 represents the light beam emitted by shoulder lamp 60; scribe line 61 and saddle line 62 represent the light beams emitted by loin lamp 63; ham lines 64 and 65 represent the light beams emitted by ham lamp 66; and foot line 67 represents the light beam emitted by foot lamp 68. Shoulder lamp 60 is stationary at all times, whereas loin lamp 63 and ham lamp 66 move longitudinally and transversely of the carcass 50, and foot lamp 68 moves longitudinally of the carcass 50.

For purposes of illustration, loin lamp 63 will be described in detail, and for this purpose we refer to FIGS. 23 through 26 and 31, 32, 35 and 37, and particularly to FIGS. 23 and 24.

Overhead mounting structure 70 provides support for all lamp assemblies, including loin lamp 63. Mounted on structure 70 by bolts 71 are roller tracks 72 and 73. Rollers 74, permanently fixed to frame 75 by roller brackets 76 and nuts 77, ride on tracks 72 and 73. Bars 77 and 78 are upper guides for rollers 74. Rollers 79, permanently fixed to frame 75 by roller brackets 80 and nuts 81, provide lateral moving support for frame 75 by engaging tracks 72 and 73.

Frame 75 is provided with rails 85 and 86 to provide support for rollers 87, which are mounted on plate 88 by brackets 89 and bolts 90. Frame 75 is also provided with upper roller guides 91 and 92. Rollers 93, mounted on plate 88 by bolts 94, provide lateral moving support for plate 88 by engaging upper guides 91 and 92. Spacers 95 and 96, secured to rails 85 and 86, space guides 91 and 92 from rails 85 and 86 and also provide support for guides 91 and 92.

Frame 75 is provided with brake assembly 100, and overhead mounting structure 70 has affixed to it braking rail 101. Directly attached to frame 75 is brake suprot 102 for slidably-mounted brake actuator 103 which has a high friction material 104 to provide friction against braking rail 101. Mounted between slidably-mounted actuator 103 and brake support 102 is spring 105 which normally urges the friction material 104 toward rail 101.

Plate 88 also utilizes a brake, generally designated as 106. Brake support 107 is attached to the bottom of plate 88 by screws 108, and the lower end 109 of rail 86 is utilized as the braking rail for brake 106. Brake actuator 110 has secured to it material 111 of a high coefficient of friction so as to provide a frictional force against the lower end 109 of rail 86, brake actuator 110 being slidably mounted on brake support 107. Spacer 112 and spring 113 are mounted between brake support 107 and rail 86 and normally urges the friction material 111 toward the lower end of rail 86.

Shaft 120 is rotatably mouned in shaft supports 121 and 122 which are secured to frame 75 by screws 123; hand grip 124 is attached to one end of shaft 120, and also mounted on shaft 120 is gear 125 by screw 126. Mounted upon the opposite side of frame 75 is bracket 127 to which is secured gear rack 128. Gear rack 128 meshes with gear 129 which, in turn, is mounted on shaft 130 of rotary switch 131 by screw 132. Rotary switch 131 is mounted on frame 70 by screws 133.

Mounted on plate 88 is gear rack 135, which engages gear 125 on shaft 120. Likewise attached to plate 88 is bracket 136 which holds extension arm 137. Arm 137, in turn, carries gear rack 138. Gear rack 138 is designed to engage gear 139 which is on shaft 140 of rotary switch 141; rotary switch 141 is mounted on frame 74 by bolts 142.

Light source 143 is in loin lamp 63. Referring to FIGS. 31 and 32, side 144 of lamp 63 has a retaining flange 145 at its lower end. Side 144 is secured to tapered portion 146, which in turn is secured to lens-mounting support 147. Positioned above flange 145 and mounted on plate 88 by bolts 148, are positioning plate 149 and slit plates 150. It should be noted that slit plates 150 are used to form light beams 61 and 62 on the hog carcass shown in FIG. 3. Lenses 151 are positioned in mounting support 147, and intensify the light passing through slit plate 150.

After the light lines have been correctly located on the carcass to be broken up and the electrical controls thus set for the carcass when it will reach subsequent stations, the carcass is subjected to the leg and ham cut-off action in station 2 and to the shoulder cut-off action in station 3, the remaining carcass halves being then separated along branch lines so that each is moved in a position longitudinal of its travel through stations 4, 5, 6 and 7. In station 4, there is the important loin-pulling operation, and we wish to describe this in detail. This station is remote from the sighting station and it well illustrates the memory system employed and the effectiveness of the sighting mechanism in controlling the remote loin-pulling operation which involves various intricate and important dividing operations.

*Loin-pulling mechanism*

The loin-pulling mechanism B is illustrated best in FIGS. 4 through 15.

The loin-pulling mechanism B includes stationary frame 160 which is mounted on overhead structure 161 (partially shown in FIG. 4) and moving frame, generally designated as 162. Stationary frame 160 and moving frame 162 are connected by two tie rods 163 and four cross bars 164.

Referring to FIGS. 5 and 6, motor 165 is mounted on stationary frame 160 on base 166. Motor shaft 167 is connected to shaft 168 of reducer 169 by means of coupling 170 and reducer 169 is permanently fixed to stationary frame 160 on base 171. Shaft 172 of reducer 169 is positioned at approximately right angles to shaft 168. One end of shaft 172 is fixed to coupling 173 to which is permanently fixed pinion 174, and the other end is permanently fixed to pinion 175.

Bracket 176, permanently fixed to stationary frame 160 by bolts 177, is attached to support 178 by bolts 179, support 178 providing a mounting for feed-back Selsyn unit 180. Shaft 181 of Selsyn unit 180 is attached to gear 182, which meshes with pinion 174 of coupling 173. Selsyn 165 is a part of a conventional Selsyn system, which is used for the vertical positioning of the loin-pulling apparatus mounted on frame 162.

Meshing with pinion 175 on shaft 172 of reducer 169 is gear 183 which is permanently fastened to drive shaft 184. Shaft 184 is rotatably supported in pillow blocks 185, 186 and 187 which are fixed to cross members 188, 189 and 190, respectively, of frame 160. Shaft 184 also passes through magnetic brake unit 191, which is permanently connected to bracket 192, and the latter in turn is attached to stationary frame 160 by bolts 193.

Attached to end members 200 and 201 of stationary frame 160 are vertical guide tracks 202 and 203 which are formed by plates 204 and by bars 205.

Mounted on both ends of shaft 184 are crank arms 206 and 207. Fastened to crank arm 206 is limit switch actuator 208. The periphery 209 of limit switch actuator 208 is positioned to contact roller actuator 210 of limit switch 211, roller actuator 212 of limit switch 213 and also roller actuator 214 of limit switch 215. Limit switch 211 is mounted on bracket 216 which is mounted on frame 160 by bolts 217; limit switch 213 is mounted on bracket 218 which in turn is secured to frame 160 by bolts 219; and limit switch 215 is mounted on bracket 220 which is fastened on frame 160 by bolts 221.

Cross bars 164 provide vertical support for frame 162 by attachment to stationary frame 160. End portions 230 of cross bars 164 are hingeably mounted on frame 160 and on frame 162 by rods 231 passing through cross bars 164 and through hinge support mounting 232, which is attached to frame 160, and hinge support mounting 233, which is attached to frame 162. End portions 234 of cross bars 164 are hingeably mounted on sliding hinge supports 235 and 236. Support 235 is free to move along guide rod 238 mounted on guide rod supports 239 which are permanently fastened to stationary frame 160. Sliding hinge support 236 is free to move along guide rod 240 which is held in a fixed position by means of guide rod supports 241 attached to frame 162. Cross bars 164 are hingeably connected, in pairs, at their center portions 242 by means of bolts 243 and nuts 244. Cross bars 164 provide vertical support for frame 162 and are hingeably mounted to sliding hinge supports 235 and 236 so as to allow frame 162 to raise and lower.

Tie rods 163 are hingeably attached to crank arms 206 and 207, by rods 250 and 251 passing through rod end bearings 252 and 253, and into crank arms 206 and 207, rod end bearings 252 and 253 being permanently fastened to tie rods 163. Tie rods 163, at their opposite ends, are fastened to rod end bearings 254 and 255. Rod end bearings 254 and 255 are hingeably attached to frame 162 by hinge supports 256 and 257 and by bolts 258 and nuts 259. Tie rods 163, being hingeably connected to crank arms 206 and 207, which in turn are connected to shaft 184, cause the vertical motion of frame 162.

Referring to FIGS. 4, 5 and 10 through 15, stationary loin knife cam plate 260 is mounted on frame 162 by cam plate supports 261 and 262. Moving loin knife cam plate 263 is slidably mounted on guide bars 264 and 265, cam plate 263 being secured to moving cam plate supports 266 and 267 which are designed to slide on guide bars 265 and 264. The ends of guide bars 264 and 265 are secured to cam support 262 and bracket 268. Cable support 269 is secured to cam plate 263 by means of bolts 270 and cable 271 is secured to cable support 269 by nuts 272. Moving cam plate 263 is provided with three extensions 274 which are provided with slots 275 receiving pins 276 on cam plate 260. On movement of cable 271, cam plate 263 moves forward or backward on guide bars 264 and 265 to an extent determined by the length of slots 275 of extensions 274. Cam plates 260 and 263 together provide cam track 277 for forward motion, and cam track 278 for reverse motion. Cam tracks 279 are slanted as illustrated in FIG. 15 to allow downward movement of cam followers. Similarly, cam tracks 280 are slanted opposite to cam tracks 279 so as to permit upward movement of the cam followers. It should be noted that cam plate 263 is provided with high point 281 on cam track 277 corresponding to the position indicated by the saddle line 62 in station 1, Control Set-Up.

Stationary scribe saw cam plate 290 is mounted on frame 162 by support bracket 291; stationary scribe saw cam plate 292 is mounted on support bracket 293 which is secured to frame 162 by bolts 294 as shown in FIG. 9. Moving scribe saw cam plate 295 is mounted on cam plate supports 296 and 297, which are provided with bearings 298 so as to allow a sliding movement of cam plate 295 on guide rods 299 and 300, shown in FIG. 9, and which are secured at their extremities upon cam plate support brackets 291 and 293. Cable 301 is fastened to bracket 302 on cam plate 295 by bolts 303. Cam plate 295 is provided with extensions 304 having slots 305 which receive pins 306 on cam plate 290. Cam plate 295 also has extensions 307 having slots 308 receiving pins 309 on cam plate 292. Cam plate 295 is free to move backward and forward upon guide rods 299 and 300, the extent of travel being limited by the length of slots 305 and 308. Cam plate 295 is provided with cam 310, slanted upward so as to carry cam roller 311 into cam track 312. Cam roller 311 rides in cam track 312 for a part of the forward stroke and for its entire reverse stroke until it drops upon contacting cam 313. Track 312 is formed in all three cam plates 290, 292 and 295. The movement of cam plate 295 corresponds to the amount of movement of loin knife cam plate 263, so it can be seen that the position of cam plate 295 is determined by the position of saddle line 62 in station 1.

Mounted on frame 162 by bolts 320 are end supports 321 and 322, as illustrated in FIG. 7. Attached to end supports 321 and 322 are guide rods 323 and 324 which are secured at their end positions to end supports 321 and 322 by flanges 325 and screws 326. Spacers 327 are secured to guide rods 323 and 324 by screws 328. Mounted parallel to and between guide rods 323 and 324 is ball screw 329 which is rotatably mounted in bearing 330 on flange 331 of end support 321, and in bearing 332 in flange 333 of end support 322.

Mounted at the forward end of ball screw 329 is sprocket 334. Motor mounting 335 is secured to frame 162 and provides support for motor 336. Mounted on shaft 337 of motor 336 is sprocket 338; chain 339 meshes with sprockets 334 and 338 so as to transmit rotation of shaft 337 to ball screw 329.

Threadedly engaging ball screw 329 and riding on guide rods 323 and 324 is the loin-pulling carriage assembly, generally designated 340, central portion 341 threadedly engaging ball screw 329. Mounted on central portion 341 are spacer 342, which is secured to guide rod runner 343, and spacer 344, which is fastened to guide rod runner 345. As partially shown in FIG. 7, guide rod runners 343 and 345 utilize ball bearings 346 to provide smooth movement of carriage assembly 340 along guide rods 323 and 324.

Scribe saw carriage, generally designated 347, is mounted on spacer 342 by side support 348, scribe saw carriage 347 being best illustrated in FIG. 8. Side support 348 is connected to side support 349 in the upper position by cross support 350 and bolts 351, and in the lower position by cross support 352 and bolts 353. Tracks 354 and 355 of scribe carriage 347 are formed by guide bars 356 and they provide guides for rollers 357 and 358 of vertical carriage 359. Sides 360 of vertical carriage 359 are held in spaced relationship by center support 361, which also provides support for roller 311. Secured to the lower end of vertical carriage 359 is scribe saw motor 362, to which is mounted scribe saw 363. Roller 311 is designed to ride on cam 310 and in cam track 312 of cam plates 290, 292 and 295.

Referring to FIG. 3, bearing 370 is provided in spacer 342 and bearing 371 is provided in spacer 344 to allow sliding movement of loin knife guide bars 372 and 373, which are provided with stops 374 and 375. Guide bars 372 and 373 are fastened to pivot bar 376 by screws 377, pivot bar 376 being pivotably mounted to loin knife support 378. Loin knife support 378 has two end supports 379 and 380 which are fastened together by tie bars 381 and 382. Mounted on end support 379 of loin knife support 378 are cam rollers 383 and 384 and loin-pulling knife 385 is fixed to loin knife support 378 by brackets 386 and 387. Cam rollers 383 and 384 are designed to ride in cam tracks 277 and 278 of loin knife cam plates 260 and 263. Also, rollers 383 and 384 are adapted to rotate knife support 378 about pivot point 388.

Referring to FIG. 7 and 9, mounted on spacer 342 is extension arm 390, having limit switch actuator 391 which is designed to contact roller 392 of limit switch 393 which is secured to frame 162 by bolts 394. When limit switch 393 is contacted, the carriage 340 has reached the end of its forward stroke and it will stop motor 336.

*Mass and element-moving mechanism and control therefor*

We have described the sighting mechanism at station 1 and the loin-pulling operation at station 4, and we now wish to describe the control mechanism which was selected at station 1 and which, on arrival of the carcass at station 4, now sets into operation means for moving the dividing elements relative to the carcass so that the loin-pulling for the particular carcass is carried out in exact response to the pre-selection effected by the sighting means at station 1.

The control means C for moving the carcass relative to the loin-pulling elements and for moving the elements relative to the carcass, are best shown in FIGS. 16 through 20.

The unit illustrated is particularly useful in the loin-pulling operation. Two units are used in the pork break-up system—one unit being used to move loin knife cam plate 263 and scribe saw cam plate 295; another unit is used for moving the loin-pulling table, which is described in our copending application, Serial No. 110,076. These units may be mounted at any point relatively close to the pork break-up machine, since movements are mechanically transmitted by cables.

The unit has a base 400, cover 401, partially shown in FIG. 16, and a surrounding framework 402. Secured to base 400 by bolts 403 is mounting frame 404. At the upper end of frame 404 is base plate 405 upon which is mounted linear motor 406. Shaft 407 passes through motor 406 and memory pin actuator 408 is secured to the front end 409 of shaft 407. Extension arm 410 is mounted to base plate 405 and is secured by screws 411. Switch bracket 412 is mounted on extension arm 410 by bolts 413 and microswitch 414 is mounted on switch bracket 412, so that roller actuator 415 of switch 414 contacts shaft 407 of linear motor 406, in its full back position, as shown in FIG. 17. Linear motor 406 contains 27 solenoid coils (not shown) which in turn are electrically connected to each of the 27 contacts in the rotary switches on loin lamp 63. Depending upon which rotary switch is energized, one of the 27 solenoids in the motor contact 406 is energized, causing a magnetic flux which moves shaft 407 to a given point.

Referring to FIG. 18, motor base 416 is secured to base 400. Motor 418, integrally connected to right angle drive unit 419, is fastened to base 420 by bolts 421, and base 420 is in turn fixed to base 400 by bolts 422. Shaft 423 of drive unit 419 is positioned at approximately right angles to the drive shaft of motor 418, and is securely attached to Geneva drive wheel 424. Referring to FIG. 19, secured to drive wheel 424 is drive actuator 425, which is designed to slidably engage slots 426 of driven wheel 427. Also secured to drive wheel 424 by screws 428 is limit switch actuator 429. Driven wheel 427 is keyed to shaft 430 by means of key 431. Limit switch actuator 429, mounted on drive wheel 424, is adapted to contact roller 432 of limit switch 433. Limit switch 433 is mounted on bracket 434, which in turn is fastened to mounting plate 405 by bolts 435.

Drive shaft 430 passes through mounting frame 404 and turns in bearings 440 and 441 and is secured to memory wheel 442. Memory wheel 442 is provided with five apertures 443 through which pass memory pins 444a through 444e; which are designed to slide in apertures 443 of memory wheel 442. Two collars 445 are mounted on each memory pin, 444a through 444e. Referring to FIGS. 21 and 22, memory pin 444 is provided with groove 446 which is designed to accommodate the brake contact 447 which is attached to spring guide 448. Spring 449 is held in a compressed position between memory wheel 442 and disc 450. Spring 451 holds memory pin 444 snugly in position, and it is fastened to memory wheel 442 by screw 452. Pin 444a is positioned to be in line with memory pin actuator 408 on shaft 407. Memory pin 444a is in position 1, and memory pin 444e is in position 5 on memory wheel 442. Correspondingly, memory pins 444b, 444c and 444d are in positions 2, 3 and 4, respectively. Memory pin 444e is held tightly by brake contact 447 which is forced inward by brake actuator 453, which is resiliently mounted on spring support 454 of frame 445, which in turn is fastened to base 400 by bolts 456. Rods 457 pass through spring support 454 and hold brake actuator 453 in position. Mounted between support 454 and actuator 453 and around rods 457 are springs 458. Brake actuator 453 is adjusted so that as memory pin 423d moves towards position 5, spring support 448 is cammed radially inward upon contacting surface 459 of actuator 452. When in position, memory pin 444e is held tightly in place.

Referring to FIGS. 16 and 20, motor 459 is mounted on base 400. Motor 459 is integrally attached to right angle drive 460 which is secured to drive mounting 461 which in turn is fastened to base 400 by bolts 462. Shaft 463 of drive 460 is mounted at a substantially right angle to the shaft of motor 459. Shaft 463 is connected to shaft 464 by coupling 465.

Referring to FIGS. 16, 17, 18 and 20, cable drive support mounting 470 is fastened to base 400. Mounting 470 has a base plate 471 upon which are mounted grooved bars 472 and 473 having runners 474 and 475 for sliding plate 476. Secured on 476 is gear rack 477, and posts 478 and 479, which provide support for shaft 480. Shaft 480 is secured to limit switch mounting plate 481, shaft 480 being mounted on posts 478 and 479 by screws 482. Limit switch 483 is secured to mounting plate 481. Limit switch 483 may be pivoted on posts 478 and 479 so roller actuator 484 of limit switch 483 contacts the end of memory pin 444e. Fastened to the opposite end of sliding plate 476 is cable mounting bracket 496.

Mounted on shaft 464 which is coupled to shaft 463, is spur gear 485 which engages gear rack 477. Shaft 464 passes through bearings 486 and 487 which are integral with mounting 470. Collars 488 and 489 are mounted on shaft 464 on both sides of bearing 487 so shaft 464 stays in proper alignment at all times. Secured to the end of shaft 464 is cam 488, and limit switch 489 mounted on the side of mounting 470 is designed so roller actuator 490 contacts cam 488.

Cables 271 and 30 are secured to cable mounting bracket 496 by nuts 492. Also, stationary cable mounting bracket 493 provides support for the outside of cables 271 and 301 by nuts 494 and is held in place on base 400 by bolts 495.

When this unit, as illustrated in FIG. 16, is utilized in conjunction with positioning loin knife cam plate 263 and scribe saw cam plate 295, two cables 271 and 301 are required, one for the loin knife cam plate and the other for the scribe saw cam plate. However, when using this unit in conjunction with positioning the loin table described in our copending application, Serial No. 110,076 only one cable is used.

Referring to FIG. 17, solenoid mounting 500 is secured to base 400 by bolts 501. Solenoid 502 is fastened to mounting 500 and is provided with shaft 503, shown in FIG. 20, which is secured to pivot arm 504, pivoted to frame 500 by bolt which passes through pivot arm 504 and into cylindrical section 506 of mounting 500. Roller 507 is fastened to pivot arm 504 by nut 508. Mounted on the other side of the pivot arm 504 is spring mounting post 509, to which is attached tension spring 510, whose other end is attached to mounting post 511 on mounting 500. Roller 507 is adapted to contact memory pin 444a. As solenoid 502 is energized, shaft 503 moves outward, moving pivot arm 504 towards memory pin 444a and is returned by tension spring 510.

Now that the structure of the basic elements of the invention have been described, the operation of the entire system will be explained to show the manner in which the cutting elements and the hog carcass may be brought into proper cutting alignment.

*Operation*

For an overall picture of the entire pork break-up machine, we refer to FIGS. 1 and 2. At the control set-up station, the halves of the hog carcasses are positioned for cutting. At approximately the same time that the hog carcass is being positioned at the Control Set-Up (station 1), the halves of another hog carcass are having the hams and hind feet cut off at the Ham and Foot Cut-Off (station 2), the halves of still another hog carcass are at the Shoulder Cut-Off (station 3). A fourth hog carcass is having its right half turned 98° and its left half turned 82°, the left and right loins of another hog carcass are being pulled at the Loin-Pulling Station (station 4). The belly and back of both halves of a sixth hog carcass are being rolled simultaneously at the Belly and Back Roll Station (station 5). Simultaneously the ribs of both left and right halves of another carcass are being pulled at the Rib-Pulling Station (station 6). Finally the bellies and backs of both halves of an eighth hog carcass are being split at the Belly-Back Split Station (station 7). Each operation takes place in approximately 10.9 seconds, so the machine is adapted to break up 330 hogs per hour.

The ham and foot cut-off mechanism is explained in detail in our copending application, Serial No. 122,321 the shoulder cut-off mechanism is fully explained in our copending patent application, Serial No. 128,733 (now Patent Number 3,144,062) the conveyor system and loin-pulling mechanism are more fully explained in our copending patent application, Serial No. 110,076; the belly and back roll mechanism is explained in our copending patent application, Serial No. 203,931; the rib-pulling mechanism is fully explained in our copending patent application, Serial No. 181,939, now U.S. Patent No. 3,177,520.

Referring to FIG. 2, the hog carcass is first moved transversely to the direction of travel and both halves are rotated and move longitudinally to the direction of travel. The ham and foot cut-off, the shoulder cut-off, the loin-pulling, belly and back roll, rib-pulling, and belly-back split operations are carried on in sequence for each carcass half.

Referring to FIG. 3, hog carcasses 50 are carried along rail 52 on the trolleys 51. A trolley 51 strikes the automatic hog dropping mechanism 53, hog carcass 50 is released, drops onto chute 54, and one operator, standing at the shoulder side 58 of the carcass 50, and a second operator, standing at the ham end 57 of the hog, pull both halves onto tables 55 and 56. Then the operator standing on the shoulder end 58 positions each half of hog carcass 50 with respect to the shoulder line 59 emitted by shoulder lamp 60. When the halves have been positioned with respect to shoulder line 59, one operator pushes a button which raises both halves of the carcass 50 off tables 55 and 56, and into the transfer position. The raising mechanism is more fully explained in our copending patent application, Serial No. 110,076.

When both halves are in the transfer position, the operator at the shoulder side 58 positions loin lamp 63 so that scribe line 61 is positioned for the scribe cut and saddle line 62 is positioned at the saddle of the animal. Scribe line 61 indicates the position at which the scribe saw will separate the spare ribs from the loin ribs. Saddle line 62 crosses the point at which the back of the hog is lowest when the animal is in a standing position. The exact position of the saddle line on a given animal varies according to the length of the animal. At the same time that the operator at the shoulder side 58 is positioning loin lamp 63, the operator at the ham side 57 is positioning ham lamp 66 and foot lamp 68 at the position indicated by ham lines 64 and 65 and foot line 67 for the ham and foot cuts. As the result of the positioning of these six light lines, the hog carcass 50 will be broken up into the major pork cuts, including shoulders, bellies, backs, ribs, loins, hams and hind feet.

After all light lines have been positioned, the carcass halves are moved in sequence to the several succeeding stations.

Referring to FIGS. 23 and 24, the mechanical operation of a typical lamp assembly will now be explained. The particular lamp assembly that will be explained is loin lamp 63, which casts scribe line 61 and saddle line 62 for the loin-pulling operation.

The operator on shoulder side 58 grasps hand grip 124 to position light beams 61 and 62 on the hog carcass 50. When the operator pulls or pushes on grip 124, moving loin lamp 63 transverse to the machine, he is positioning saddle line 62. Pushing or pulling grip 124, which is secured to shaft 120 which in turn is fastened to supports 121 and 122 on frame 75, causes movement of frame 75. Rollers 74, riding on tracks 72 and 73 of frame 70, allow the frame 75 to roll backward and forward and rollers 79 provide lateral support for the rolling of frame 75 by contacting the sides of tracks 72 and 73. Rollers 74 are also guided by bars 77 and 78. In order that movement of frame 75 is smooth, brake 100 is provided, spring 105 providing a normal force against braking rail 101, which is mounted on stationary frame 70.

Gear rack 128 is mounted on bracket 127 on frame 75, so as frame 75 is rolled backward and forward, gear rack 128 moves backward and forward. Gear rack 128 is adapted to engage gear 129 on shaft 130 of rotary switch 131 which is on the stationary frame 70. So, as gear rack 128 is moved, shaft 130 of rotary switch 131 rotates, causing the closing of one of 27 open contacts in switch 131, thereby completing a particular circuit. The circuit that is closed corresponds electrically to the position of saddle line 62 on the hog carcass in the Control Set-Up (station 1).

Now that the positioning of saddle line 62 has been described, the movement of grip 124 which positions scribe line 61 will be described. Since shaft 120 is attached to spur gear 125, rotation of shaft 120 by turning grip 124 will cause a corresponding rotation of gear 125. Since gear 125 engages gear rack 135, this rotational movement causes movement of mounting plate 88 relative to frame 75, gear rack 135 being fixed to mounting plate 88. Mounting plate 88 moves on rollers 87 which ride on tracks 85 and 86. Lamp assembly 63, being mounted on mounting plate 88, then moves sideways, the direction depending on rotation of shaft 120. Mounting plate 88 is provided with a braking mechanism 106 which provides for a smooth movement of plate 88. Rotation of shaft 120 on loin lamp 63 positions scribe line 61 on carcass 50 in the Control Set-Up (station 1).

By moving plate 88, gear rack 138 mounted on arm 137 is moved. Gear rack 138 meshes with gear 139 on shaft 140 of rotary switch 141. Therefore, movement of rack 138 rotates shaft 140 of rotary switch 141 and causes the closing of one of 27 normally open contacts in switch 141. The particular contact that is closed corresponds electrically with the position of scribe line 61 on hog carcass 50 in station 1.

Referring to FIGS. 23, 31 and 35, lamp 143 casts a light down through the slits formed by slit plates 150, and this light is intensified by lenses 151 so as to provide light lines upon carcass 50. The crossing slits shown in FIG. 35 correspond to lines 61 and 62 which are thrown upon the carcass of the animal.

To summarize, as the operator pushes or pulls loin lamp 63, saddle line 62 is positioned on carcass 50, and as the operator turns shaft 124, he is positioning scribe line 61 on carcass 50. These two movements impart a mechanical rotation of shafts 130 and 140 of rotary switches 131 and 141 and cause the closing of two electrical circuits which correspond electrically with the position of the light lines 61 and 62 on the hog carcass 50.

For purposes of simplification, there will be an explanation of only one rotary switch circuit, and it will cover positioning loin knife cam plate 263 and scribe saw cam plate 295. Therefore, this explanation will relate to the push-pull movement of loin lamp 63 and rotary switch 131.

Referring to FIGS. 16 and 17, linear motor 406 contains 27 solenoid coils, each coil being connected electrically to one of the 27 normally open contacts in rotary switch 131. So, depending on which contact on rotary switch 131 is closed, one of the solenoid coils in linear motor 461 will ultimately be energized. Linear motor 406 is energized after the operator in the Control Set-Up Station presses the set-up button, and also after the 10.9 second cycle timer (not shown) energizes the starting circuit. Shaft 407 moves outward to a given point due to magnetic flux set up in the solenoid coil. This shaft moves in approximately ⅛ inch increments, depending on the position of the energized coil in linear motor 406.

The memory pin actuator 408, being secured to shaft 407, moves outward with shaft 407, and pushes memory pin 444a outward a distance corresponding to the position of the energized coil in motor 406. Spring 451 prevents movement of pin 444a beyond the point that it is pushed by actuator 408, which otherwise could occur because of the momentum of memory pin 444a. Then, after a given length of time, a cycle timer (not shown) de-energizes the coil circuit and energizes the last solenoid coil in linear motor 406, so as to return shaft 407 to the starting position, and this last coil is subsequently de-energized. Upon reaching the starting position, shaft 407 contacts roller actuator 415 of switch 414, and energizes the circuit in switch 414.

When the circuit in limit switch 489 is closed, and when switch 414 is closed, index motor 418 starts, rotating shaft 423 on drive 419. Shaft 423, being secured to drive wheel 424 of the Geneva drive, rotates wheel 424, which causes actuator 425 to move in and out of slots 426. This causes driven wheel 427 to turn through one position, an angle of 72°. Index motor 418 is stopped when the contact in limit switch 433 is closed by limit switch actuator 429 on drive wheel 424 contacting roller actuator 432 of limit switch 433. Movement of driven wheel 427 is in the direction from position 1 to position 2, which is opposite to the direction of rotation of drive wheel 424.

Referring to FIG. 20, shaft 430 being secured to driven wheel 427 and memory wheel 442, causes memory wheel 442 to turn to the same extent and in the direction of driven wheel 427. Memory pin 444a has then moved to the position formerly occupied by pin 444b, which in turn has been moved to the position occupied by pin 444c, etc.

When memory pin 444a is in position 2, the particular hog corresponding to the pin position is in the Ham and Foot Cut-Off (station 2); when pin 444a moves to the position 3, the corresponding hog carcass is in the Shoulder Cut-Off (station 3); when pin 444a is in position 4, the corresponding hog halves are being turned or diverted; and when pin 444a is in position 5, the corresponding hog carcass is in the loin-pulling station 4, and it is in position 5 that memory pin 444a performs its positioning function.

Referring to FIGS. 17 and 20, motor 459 starts when the circuit in switch 414 is closed and when the circuit in limit switch 393 is closed. Motor 459, through angle drive unit 460, rotates shaft 463 which, being coupled to shaft 464, rotates shaft 464. Rotation of shaft 464 causes rotation of spur gear 485 and spur gear 485, meshing with gear rack 477 on sliding plate 476, imparts a sliding motion to sliding plate 476. Referring to FIG. 17, limit switch 480, being mounted on sliding plate 476, moves with sliding plate 476 towards memory pin 444 in position 5. Roller actuator 484 is designed to contact memory pin 444 in position 5, and when contact is made, motor 459 stops.

The function of memory pin 444a is to contact roller 484 of limit switch 480 after limit switch 480 has moved a desired distance, thereby stopping motor 459.

Referring to FIG. 16, sliding plate 476 has mounted on it cable support bracket 496, to which are secured cables 270 and 301, which impart motion to loin knife cam plate 263 and scribe saw cam plate 295. As sliding table 476 moves, cables 270 and 301 move, causing movement of cam plates 263 and 295.

It should be noted that brake actuator 453 imparts a radial force against spring support 448, which holds brake contact 447 tightly in groove 446 of pin 444. This holds pin 444a tightly in position while contacting roller actuator 484 of limit switch 483.

The reverse circuit of motor 459 is set up by limit switch 483 at the same time that it is stopped. The reverse circuit is started by closing limit switch 393 when roller 392 contacts actuator 391 on loin-pulling carriage 340. The reverse drive operates until cam 488 energizes the circuit limit switch 489, by contacting roller actuator 490. This not only stops the reverse circuit, but also sets up the forward circuit.

After the cam drive has been returned to the starting position, memory wheel 442 rotates one position carrying memory pin 444a from position 5 to position 1, completing one revolution. In order to return pin 444a to the starting position so that it may be properly positioned by the circuit in linear motor 406, solenoid 502 is energized when the circuit in switch 433 is closed. This causes shaft 503 to move outward, pivoting arm 504 about pivot point 505, and causing roller 51 to push memory pin 444a back until collar 425 contacts with memory wheel 442. After a given length of time, a timer de-energize solenoid 502 and arm 504 is returned to the starting position by spring 510.

To summarize, one coil in linear motor 406 will be energized when a contact in rotary switch 131 is closed. When the operator presses the set-up button and when the 10.9 second cycle timer energizes the starting circuit, the energized coil causes shaft 407 to move outward and, through memory pin actuator 408, pushes memory pin 444a outward. The memory wheel turns until pin 444a reaches position 5. At position 5, memory pin 444a performs its function. At the proper time, motor 459 starts and moves sliding table 476 outward until memory pin 444a in position 5 contacts roller actuator 484 of limit switch 483. This stops motor 459 and sets up the reverse circuits. After the loin has been pulled, the motor is returned to the starting position, at which time memory wheel 442 is indexed; and when motor 418 has stopped, limit switch 433 energizes solenoid 502, causing roller 510 to push pin 444a to the starting position. This completes one cycle of one of the memory pins.

A detailed explanation of the loin-pulling operation will be found in our copending application. Serial No. 110,076. It is sufficient here, for the purpose of this application, to describe the bringing of the carcass and the cutting elements into proper alignment and particularly the movement of cam plates 263 and 295.

In brief, in order to bring the hog carcass into proper alignment with the cutting elements, three movements are required. One movement is the vertical movement of frame 162. A second movement is the transverse positioning of the carcass for the scribe cut. The third movement adjusts for the length of the animal according to the location of the saddle on the animal. This third movement will now be explained.

Referring to FIGS. 10 through 15, cable 270 is secured to cable bracket 268 which is fastened to loin knife cam plate 263, and cable 301 is secured to bracket 302 on scribe saw cam plate 295. Cables 270 and 301 are mounted on cable support 496, as shown in FIG. 18. Therefore, the motion imparted to cables 270 and 301 is ultimately transferred to cam plates 263 and 295. As motor 453 moves table 476, cable 270 pulls cam plate 263 from cam plate 260. When pin 444a contacts limit switch 483, motor 459 stops and cam 263 is held in a set position. Cam plate 263 rides on guide rods 264 and 265 by means of brackets 266 and 267. Guide rods 264 and 265 are secured to frame 162 by brackets 262 and 263. Slots 274 in extensions 273 ride on pins 275 so cam tracks 276 and 277 are formed by both cam plates 260 and 263. At the start of the forward stroke, rollers 383 and 384 ride in cam track 276, movement being from cam plate 260 forward to cam plate 263. The high point 280 of cam track 263 corresponds to the saddle position on the hog carcass. At this position, rollers 283 and 284 rise to follow the contour of the animal. The high point 280, the saddle position, is at a different position for each animal carcass. At the end of the forward stroke, rollers 283 and 284 rise on tracks 277 and into track 277 until the forward motion of motor 336 is stopped. By the closing of the circuit in limit switch 393 upon actuator 391 contacting roller 392, motor 336 is then reversed, and the rollers 283 and 284 ride in track 277 and drop down to track 276, at which time the motor is stopped. This motion is imparted to loin knife 385 and to scribe saw 363 by motor 336 turning sprocket 338, meshing with chain 339 which meshes with sprocket 334, turning ball screw 329. Ball screw 329 threadedly engages loin-pulling carriage assembly 340 and pulls both knife 385 and saw 363.

Referring to FIGS. 11 and 16, as plate 476 moves, cable 301 pulls cam plate 295 away from cam plate 292 and positions the plate 292 for the proper length. Roller 311 of saw carriage 359 contacts cam 310 after the ribs have been properly cut. When roller 311 contacts cam 310, carriage 359 moves upward, is carried into track 312, and is carried forward until loin-pulling carriage 340 has stopped, as previously explained. Then roller 311 reverses along track 312 until it drops down upon reaching cam 313.

It will be understood that many operations are taking place simultaneously. In a complete cycle of operations, the following parts are operating in the sequences described. Linear motor 406 moves forward, positioning memory pin 444a in position. Cam plates 263 and 295 are being positioned by motor 459. Then linear motor 406 returns to the starting position. The motor 459 is stopped and the reverse circuit is set up. Loin-pulling carriage 340 now moves in its cutting stroke. When the loin-pulling carriage 340 reaches the end of its cutting stroke, the carriage reverses. Upon completion of the cutting stroke of the loin-pulling carriage 340, the reverse circuit of motor 459 is energized and cam plates 263 and 295 are returned to the starting position. When motor 459 and linear motor 406 are at the starting positions, motor 418 indexes the Geneva drive and memory wheel 442, one position. When motor 418 stops, memory pin 444a is moved to the starting position.

A complete cycle of operations is performed every 10.9 seconds and, as pointed out above, operations are being performed at each station of the pork break-up machine.

As a result of the pre-selection at the sighting station and the subsequent automatic operations controlled through the memory system, the entire break-up of the carcass is accomplished by not more than two operators, while at the same time the break-up is accomplished in much less time and with great accuracy.

While, in the foregoing specification, we have described the apparatus and method of procedure in considerable detail for the purpose of illustrating a specific embodiment of the invention, it will be understood that such details of structure and procedure may be varied widely by those skilled in the art without departing from the spirit of our invention.

We claim:
1. In a process for breaking up an animal carcass having shoulder, leg and loin portions, the steps of moving said animal carcass along a path of travel with its transverse axis moving along the path of travel, cutting off said leg and shoulder portions, turning said carcass and moving said carcass so that its longitudinal axis is moved along the path of travel, and then pulling the loin therefrom in a longitudinal direction.

2. In a process for breaking up an animal carcass having shoulder, leg, loin and rib portions, the steps of moving said carcass along the path of travel with its transverse axis moving along the path of travel, cutting off said leg and said shoulder portions, turning said carcass and moving said carcass so that its longitudinal axis is moved along the path of travel, severing the ribs longitudinally of the carcass, and pulling the loin from the carcass in a longitudinal direction.

References Cited by the Examiner

UNITED STATES PATENTS 1,386,824  8/1921  White _____ 17—1

SAMUEL KOREN, *Primary Examiner.*

LUCIE H. LAUDENSLAGER, *Examiner.*